US009860216B2

(12) United States Patent
Bruce et al.

(10) Patent No.: US 9,860,216 B2
(45) Date of Patent: Jan. 2, 2018

(54) ANONYMOUS DECISIONS IN AN ACCESS CONTROL SYSTEM

(71) Applicant: Axis AB, Lund (SE)

(72) Inventors: Mathias Bruce, Lund (SE); Marcus Johansson, Lund (SE)

(73) Assignee: AXIS AB, Lund (SE)

( * ) Notice: Subject to any disclaimer, the term of this patent is extended or adjusted under 35 U.S.C. 154(b) by 46 days.

(21) Appl. No.: 14/028,236

(22) Filed: Sep. 16, 2013

(65) Prior Publication Data

US 2015/0082033 A1 Mar. 19, 2015

(51) Int. Cl.
*H04L 29/06* (2006.01)
*G06F 9/54* (2006.01)

(52) U.S. Cl.
CPC ............ *H04L 63/0428* (2013.01); *G06F 9/54* (2013.01); *H04L 63/08* (2013.01); *H04L 63/20* (2013.01); *G06F 2221/2141* (2013.01)

(58) Field of Classification Search
CPC ......... G06Q 20/40975; G06Q 20/3674; G06Q 20/409; G07F 7/1008; H04W 48/14; H04L 63/0428; H04L 63/08; H04L 63/10; H04L 63/101; H04L 63/20; H04L 63/205; G06F 21/62; G06F 21/6209; G06F 21/6218; G06F 2221/2141; G06F 17/30238; G06F 17/30345
USPC ......................................................... 713/168
See application file for complete search history.

(56) References Cited

U.S. PATENT DOCUMENTS

| 2002/0099945 | A1* | 7/2002 | McLintock et al. ........... 713/186 |
| 2004/0103288 | A1* | 5/2004 | Ziv et al. ....................... 713/185 |
| 2005/0171872 | A1 | 8/2005 | Burch et al. |
| 2005/0289644 | A1 | 12/2005 | Wray |
| 2006/0053112 | A1* | 3/2006 | Chitkara ............ G06F 17/30595 |
| 2008/0086758 | A1* | 4/2008 | Chowdhury ........ G07C 9/00103 726/2 |
| 2008/0163361 | A1* | 7/2008 | Davis et al. ..................... 726/19 |
| 2008/0173709 | A1 | 7/2008 | Ghosh |

(Continued)

OTHER PUBLICATIONS

Sybase, User Guide for Encrypted Columns, Sybase, [online], Nov. 2008 [retrieved on Jan. 9, 2014]. Retrieved from the Internet:<http://infocenter.sybase.com/archive/topic/com.sybase.infocenter.dc00968.1502/pdf/Encryption.pdf>.*

(Continued)

*Primary Examiner* — Minh Dinh
(74) *Attorney, Agent, or Firm* — Snyder, Clark, Lesch & Chung, LLP

(57) ABSTRACT

A controller device may correspond to a physical access controller in a distributed physical access control system. The controller device may include logic configured to obtain access to a global database that include access control information for a plurality of controller devices. The logic may be further configured to derive a local access rules table from the global database, wherein the local access rules table relates users to access rules, and wherein the local access rules table is encrypted with a local access rules key; and derive a local credentials table from the global database, wherein the local credentials table relates hashed credentials to users, wherein the local credentials table stores, for a user, the local access rules key encrypted with unhashed credentials associated with the user, wherein the unhashed credentials are not stored in the controller device.

26 Claims, 14 Drawing Sheets

(56) References Cited

U.S. PATENT DOCUMENTS

| | | |
|---|---|---|
| 2008/0209506 A1* | 8/2008 | Ghai et al. .................. 726/1 |
| 2010/0192220 A1 | 7/2010 | Heizmann et al. |
| 2011/0115603 A1 | 5/2011 | Conlin et al. |
| 2012/0169461 A1 | 7/2012 | Dubois, Jr. |
| 2014/0075514 A1* | 3/2014 | Prasad ................ G06F 21/78 726/4 |

OTHER PUBLICATIONS

Shadow Password, passwd, Wikipedia, [online], Dec. 2014 [retrieved on Jan. 9, 2015]. Retrieved from the internet:<http://en.wikipedia.org/wiki/Passwd>.*

Sybase, Sybase Replication Manual, [online], Mar. 2006 [retrieved on Jan. 10, 2015]. Retrieved from the internet:<http://infocenter.sybase.com/help/topic/com.sybase.help.rs_15.0. refman/pdf/refman.pdf>.*

Managing Remote Servers, Sybase [online], Nov. 2009 [retrieved on Jan. 11, 2015]. Retrieved from the interenet:<http://infocenter.sybase.com/help/topic/com.sybase.infocenter.dc31654.1550/pdf/sag1.pdf>.*

Petkovic, Microsoft © SQL Server © 2012: A Beginners Guide, Fifth Edition, McGraw-Hill 2012.*

Kline, Ran, "Next Generation PACS". Secure ID News. Apr. 20, 2010. http://secureidnews.com/news-item/next-generation-pacs/.

Extended European Search Report issued in corresponding European Application No. 13185568.6, 8 pages.

* cited by examiner

354

| ROW | USER | CREDENTIAL TYPE | CREDENTIAL VALUE |
|---|---|---|---|
| 21 | JACK | CARD | 40APCE |
| 21 | JACK | PIN | 1234 |
| 21 | JACK | IRIS | IRIS SCAN VALUE |
| 44 | JILL | FINGERPRINT | PRINT VALUE |
| ⋮ | | | |

| ROWS | ROOM | |
|---|---|---|
| | ROOM E | 8 AM TO 5 PM, CARD |
| 21, 55, 76 | ROOM E | NON-BUSINESS HOURS, CARD + PIN |
| 44, 55, 66, 78 | ROOM A | ALL TIMES, IRIS |
| 33, 44, 66 | ROOM A | 5 PM TO 8 AM, CARD + IRIS |
| ⋮ | | |

| ROW | CARD HASH | KEY ENCRYPTED WITH 40APCE |
|---|---|---|
| 21 | CARD + PIN HASH | KEY ENCRYPTED WITH 40APCE + 1234 |
| 44 | IRIS HASH | KEY ENCRYPTED WITH IRIS OF 44 |
| 44 | CARD + IRIS HASH | KEY ENCRYPTED WITH CARD + IRIS OF 44 |
| ⋮ | | |

FIG. 13C

ANONYMOUS DECISIONS IN AN ACCESS CONTROL SYSTEM

FIELD

This disclosure generally relates to access control systems, and more specifically, to anonymous access control decisions in access control systems.

BACKGROUND INFORMATION

Access control systems may be used to control physical access to a facility. An access control system (as well as other types of control systems) may have numerous controllers, each controlling a different part of the system. Each controller may store device-specific information, such as configuration information, peripheral settings, etc.

SUMMARY

According to one aspect, a method, performed may a controller device may include obtaining, by the controller device, access to a global database that include access control information for a plurality of controller devices; deriving, by the controller device, a local access rules table from the global database, wherein the local access rules table relates users to access rules, and wherein the local access rules table is encrypted with a local access rules key; and deriving, by the controller device, a local credentials table from the global database, wherein the local credentials table relates hashed credentials to users, wherein the local credentials table stores, for a user, the local access rules key encrypted with unhashed credentials associated with the user, wherein the unhashed credentials are not stored in the controller device.

Additionally, the method may include receiving a credentials value from a reader device; hashing the received credentials value; determining whether a credentials entry exists for the hashed credentials value in the local credentials table; and identifying a user associated with the hashed credentials value in the local credentials table, when the credentials entry exists for the hashed credentials value in the local credentials table.

Additionally, the method may include decrypting the local access rules key, associated with the credentials entry, using the received credentials value; decrypting the local access rules table using the decrypted local access rules key; determining whether an access rules entry exists in the decrypted local access rules table for the user; and executing one or more access rules associated with the user based on the access rules entry, when the access rules entry exits in the decrypted local access rules table for the user.

Additionally, the controller device may belong to a distributed system that includes the plurality of controller devices, and the global database may correspond to a distributed dataset in the distributed system.

Additionally, the method may include receiving an update to the global database from the administrator device; distributing the update to other ones of the plurality of devices; and updating the global database using the received update, wherein the global database is updated at the other ones of the plurality of devices.

Additionally, the method may include storing the global database; and enabling the plurality of controller devices to access the global database.

Additionally, the controller device may belong to a distributed system that includes the plurality of controller devices, the global database may be stored in another controller device of the plurality of controller devices, and obtaining access to the global database may include accessing the global database at the other controller device.

Additionally, the method may include obtaining an update for the global database; determining that the update is relevant to at least one of the local access rules table or the local credentials table; and updating the at least one of the local access rules table or the local credentials table using the updated global database, based on determining that the update is relevant to the local database.

Additionally, the local credentials table may be encrypted using a local credentials key, and the method may further include decrypting the local credentials table using the local credentials key; updating a hashed credentials value in the local credentials table; obtaining an unencrypted local access rules key from the decrypted global database; and encrypting the local access rules key with an unhashed credentials value, wherein the encrypted local access rules key is associated with the hashed credentials value.

Additionally, the method may include obtaining an unencrypted local access rules key from the decrypted global database; decrypting the local access rules table using the obtained unencrypted local access rules key; updating the local access rules table; and encrypting the updated local access rules table.

Additionally, the local access rules table may associate a particular access location with a particular group of users and with a particular set of access rules.

Additionally, the method may include deriving a remote local access rules table from the global database for another controller device of the plurality of controller devices; deriving a remote local credentials table from the global database for the other controller device; and enabling the other controller device to access the remote local access rules table and the remote local credentials table.

Additionally, a user may be associated with a global database row number in the global database, the user may be associated with the global database row number in the local access rules table, and the user may be associated with the global database row number in the local credentials table.

Additionally, the controller device may correspond to an embedded system.

Additionally, the plurality of controller devices may correspond to a distributed physical access control system and the controller device may correspond to a physical access control unit.

According to another aspect, a controller device may include logic configured to obtain access to a global database that include access control information for a plurality of controller devices; derive a local access rules table from the global database, wherein the local access rules table relates users to access rules, and wherein the local access rules table is encrypted with a local access rules key; and derive a local credentials table from the global database, wherein the local credentials table relates hashed credentials to users, wherein the local credentials table stores, for a user, the local access rules key encrypted with unhashed credentials associated with the user, wherein the unhashed credentials are not stored in the controller device.

Additionally, the logic may be further configured to receive a credentials value from a reader device; hash the received credentials value; determine whether a credentials entry exists for the hashed credentials value in the local credentials table; and identify a user associated with the hashed credentials value in the local credentials table, when the credentials entry exists for the hashed credentials value in the local credentials table.

Additionally, the credentials value may include one or more of a sequence of keypad characters; a value obtained from a keycard; a feature vector obtained from an iris scan; a feature vector obtained from a voice sample; or a feature vector obtained from a fingerprint scan.

Additionally, the logic may be further configured to decrypt the local access rules key, associated with the credentials entry, using the received credentials value; decrypt the local access rules table using the decrypted local access rules key; determine whether an access rules entry exists in the decrypted local access rules table for the user; and execute one or more access rules associated with the user based on the access rules entry, when the access rules entry exits in the decrypted local access rules table for the user.

Additionally, the controller device may belong to a distributed system that includes the plurality of controller devices and the global database may correspond to a distributed dataset in the distributed system.

Additionally, the logic may be further configured to receive an update to the global database from the administrator device; distribute the update to other ones of the plurality of devices; and update the global database using the received update, wherein the global database is updated at the other ones of the plurality of devices.

Additionally, the logic may be further configured to store the global database; and enable a plurality of other controller devices to access the global database.

Additionally, the controller device may belong to a distributed system that includes a plurality of controller devices, the global database may be stored in another controller device of the plurality of controller devices, and the logic may be further configured to access the global database at the other controller device.

Additionally, the logic may be further configured to derive a remote local access rules table from the global database for another controller device; derive a remote local credentials table from the global database for the other controller device; and provide the remote local access rules table and the remote local credentials table to the other controller device.

Additionally, the plurality of controller devices may correspond to a distributed physical access control system, and the controller device may correspond to a physical access control unit.

According to yet another aspect, a distributed system may include a plurality of physical access control devices, wherein a particular one of the plurality of physical access control devices is configured to obtain access to a global database that include access control information for a plurality of controller devices; derive a local access rules table from the global database, wherein the local access rules table relates users to access rules, and wherein the local access rules table is encrypted with a local access rules key; and derive a local credentials table from the global database, wherein the local credentials table relates hashed credentials to users, wherein the local credentials table stores, for a user, the local access rules key encrypted with unhashed credentials associated with the user, wherein the unhashed credentials are not stored in the particular one of the plurality of physical access control devices.

BRIEF DESCRIPTION OF THE DRAWINGS

FIGS. 13A-13C are diagrams of an exemplary database use scenario according to one or more embodiments.

DETAILED DESCRIPTION

Figure 1:
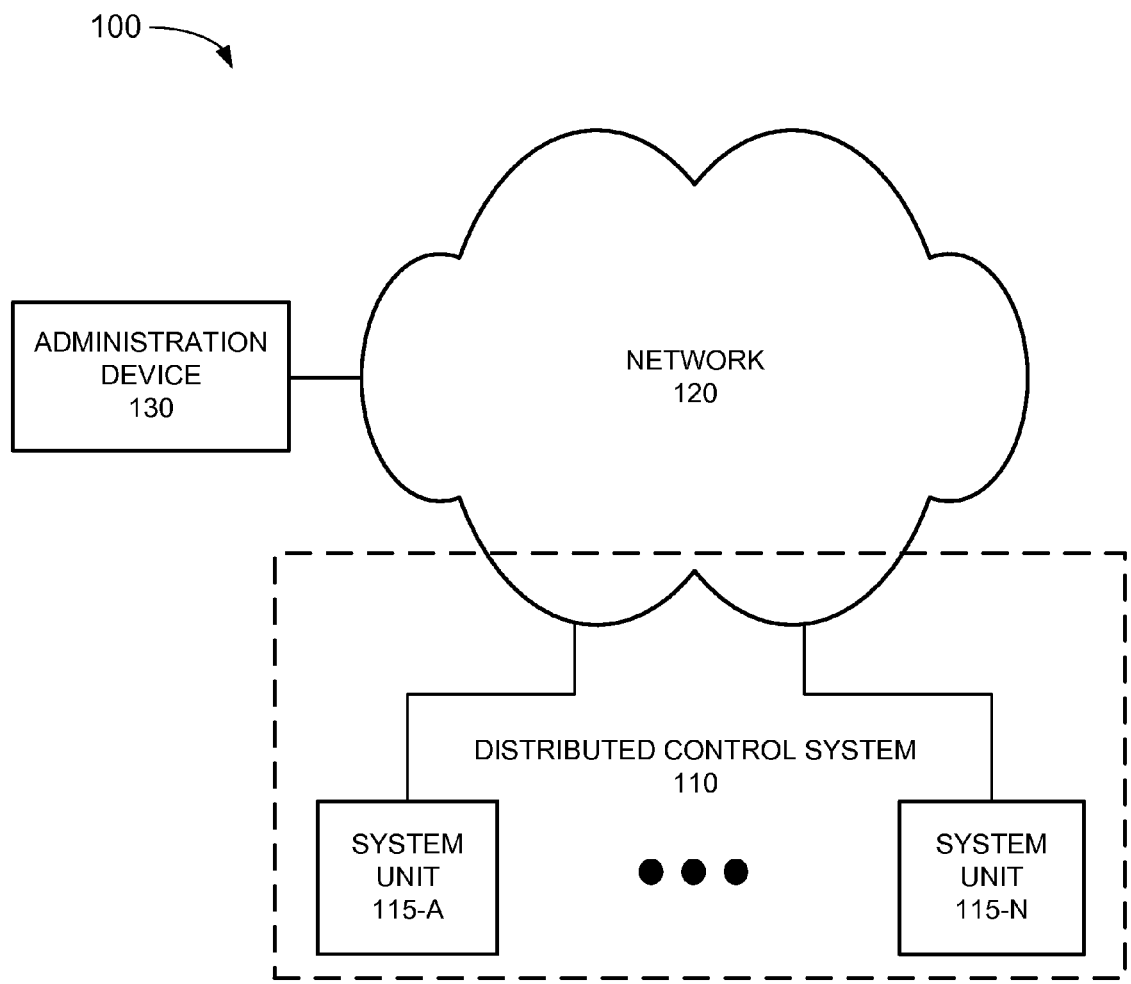
FIG. 1 is a block diagram illustrating an exemplary environment according to an embodiment described herein.

The following detailed description refers to the accompanying drawings. The same reference numbers in different drawings identify the same or similar elements.

Embodiments described below relate to anonymous databases in control systems. A global database may be maintained for a control system. The global database may include user information, such as a user's identifying information. The user information may further include credential values for users. A credential value may be used to validate a user in connection with a particular controller device of the control system. For example, the credential value may be stored in an access card of the user and a reader device may scan the access card to determine whether to grant access to the user. The global database may further include access control information, such as which users should be granted access based on parameters such as time of day, access areas, etc.

The global database may be used to derive an anonymous local access rules table for a particular device in the control system and/or an anonymous local credentials table for the particular device. The local access rules table may relate users, or groups of users, to access rules relevant to the particular device. The local access rules table may be encrypted with a local access rules key. The term "key" used herein may refer to an encryption/decryption key. The local credentials table may relate hashed credential values to user and may store an encrypted version of the local access rules key for each user, wherein the local access rules key is encrypted with unhashed credential values for the user. The unhashed credential values may not be stored by the particular device and may be obtained by a reader device (e.g., an access card reader) when the user requests access. "Anonymous" may refer to excluding identifying information for a user (e.g., the user's name, employee number, etc.). Furthermore, the terms "database" and "table" are used interchangeably. Thus, the local access rules table and the local credentials table may not include any personal user information and, therefore, if the security of an access device is compromised, personal user information cannot be obtained from the local tables in the access device.

In some implementations, the control system may include a distributed control system. A distributed control system may include a distributed physical access control system. A physical access control system may include one or more access control units with each access control unit controlling physical access to an area of a facility. For example, an access control unit may obtain credentials from a user and may unlock a door lock if the user's credentials are verified. In other implementations, a distributed control system may include a distributed building management system, a distributed monitoring system, a distributed security system, and/or another type of a distributed control system.

In some implementations, the global database may correspond to a distributed dataset, each control unit in the system may store a local copy of the distributed global database, and each control unit may derive a local access rules table and/or a local credentials table from the local copy of the distributed global database. In other implementations, some control units may not include a copy of the distributed global database. For example, a control unit in a high risk area may not include a copy of the distributed global database. Instead, another control unit may derive a local access rules table and/or a local credentials table for the high risk control unit and may provide the local access rules table and/or the local credentials table to the high risk control unit. In yet other implementations, a single control unit may be designated to include the global database and other control units may access the global database to derive their respective local access rules tables and/or local credentials tables. In yet other implementations, the global database may be stored outside of the control system in, for example, an administration device.

In other implementations, the control system may not correspond to a distributed system. For example, the control system may include a group of networked control devices with access to a global database, which may be stored by one or more of the networked control devices, or by another device, such as an administration device.

FIG. 1 is a block diagram of an exemplary environment 100 in which the systems and/or methods described below may be implemented. As shown in FIG. 1, environment 100 includes a distributed control system 110 (e.g., a distributed physical access control system), a network 120, and an administration device 130.

Distributed control system (DCS) 110 may include a distributed computing system that includes system units 115-A to 115-N (referred to collectively as "system units 115" and individually as "system unit 115"). System unit 115 may be implemented as an embedded system. In some implementations, system unit 115 may include a physical access control device. For example, system unit 115 may include an access controller that controls access to a secured area, such as a room or a group of rooms. System unit 115 may receive credentials (e.g., access card credentials) via a reader device and to determine whether the credentials are authentic and are associated with authority to access the secure area. If so, the access controller may issue a command to open a lock on a door or perform other operations associated with granting access to the secure area. In other implementations, system unit 115 may include a different type of security device, such as a monitoring device a device that controls the operation of a machine, etc. In other implementations, system unit 115 may include another type of embedded system.

DCS 110 may include one or more distributed datasets. A distributed dataset includes a dataset associated with multiple devices, wherein the In one embodiment, multiple devices may communicate and coordinate with each other to make changes to the dataset. In one embodiment, a local copy of the distributed dataset is maintained by each device that is associated with the distributed dataset and if a change is agreed upon by the devices, the change is replicated to the local copies of the distributed datasets. In another embodiment, not all the devices store a local copy of the distributed dataset, for example.

In some embodiments, consensus is reached in order for a change to be made in the distributed dataset (e.g., a consensus-based distributed database). In other embodiments, a change may be made to the distributed dataset without consensus. A distributed dataset may be associated with all system units 115 or may be associated with a subset of system units 115. A system unit 115 may propose a change to a consensus-based distributed dataset. If the change is accepted by a quorum of system units 115 associated with the distributed dataset, a consensus may be reached and the change may be propagated to each local copy of the distributed dataset in each associated system unit 115. Thus, a consensus with respect to a change in the distributed dataset may be reached if a quorum of the associated system units 115 votes for the change. A quorum may correspond to the smallest majority of the associated system units 115. Thus, if a distributed dataset is associated with N system units 115, a quorum may be reached if N/2+1 associated system units 115 votes for the change if N is an even number, or if (N−1)/2+1 associated system units 115 votes for the change if N is an odd number. Requiring a smallest majority to reach a quorum may ensure that when considering two conflicting proposals, at least one system unit 115 receives both proposals and selects one of the proposals for consensus.

A consensus-based distributed dataset may ensure that any system unit 115 associated with the distributed dataset includes the information (e.g., all the information in one embodiment) managed by the distributed dataset. For example, a distributed dataset may include access rules and the access rules may be available to any system unit 115 associated with the distributed dataset. Thus, as a result of the one or more distributed datasets, in one embodiment, DCS 110 may correspond to a decentralized system with no central controlling device, such as a server device. In other embodiments, DCS 110 may include both a decentralized system and a central controlling device (such as a server device). Changes to DCS 110 may be configured at any system unit 115 and if the change is associated with a distributed dataset, the change may be propagated to other system units 115 associated with the distributed dataset. Furthermore, DCS 110 may exhibit robustness with respect to device failure, as a single point of failure may be avoided. For example, if a particular system unit 115 fails, the other system units 115 may continue to operate without loss of data (or with the minimization of loss of data). Moreover, DCS 110 may be changed dynamically. For example, applications may be added at any time and new datasets may be stored in system units 115 as needed.

DCS 110 may also include datasets that are not distributed. As an example, a first system unit 115 may include a local dataset that is not included in any other system unit 115. As another example, a first system unit 115 may include a local dataset that is replicated to a second system unit 115 in a non-distributed manner, such as by being mirrored. As yet another example, a first system unit 115 may include a first version of a local dataset and a second system unit 115 may include a second version of the local dataset, wherein the first system unit 115 maintains the first version of the local dataset and the second system unit 115 maintains the second version of the local dataset. In yet another example, a first system unit 115 may derive a first local dataset from a distributed dataset and a second system unit 115 may derive a second local dataset from the distributed dataset, wherein the first local dataset is different from the second local dataset.

Network 120 may enable system units 115 to communicate with each other and/or may enable administration device 130 to communicate with particular system units 115. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Administration device 130 may enable an administrator to connect to a particular system unit 115 in order to configure DCS 110, change a configuration of DCS 110, receive information from DCS 110, and/or otherwise administer DCS 110. Administration device 130 may include any device configured for communicating with a system unit 115. For example, administration device 130 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100. For example, in some implementations, system units 115 may include an input and/or output device (e.g., keyboard/keypad and display, touchscreen, etc.) and administration device 130 may not be needed.

Figure 2:
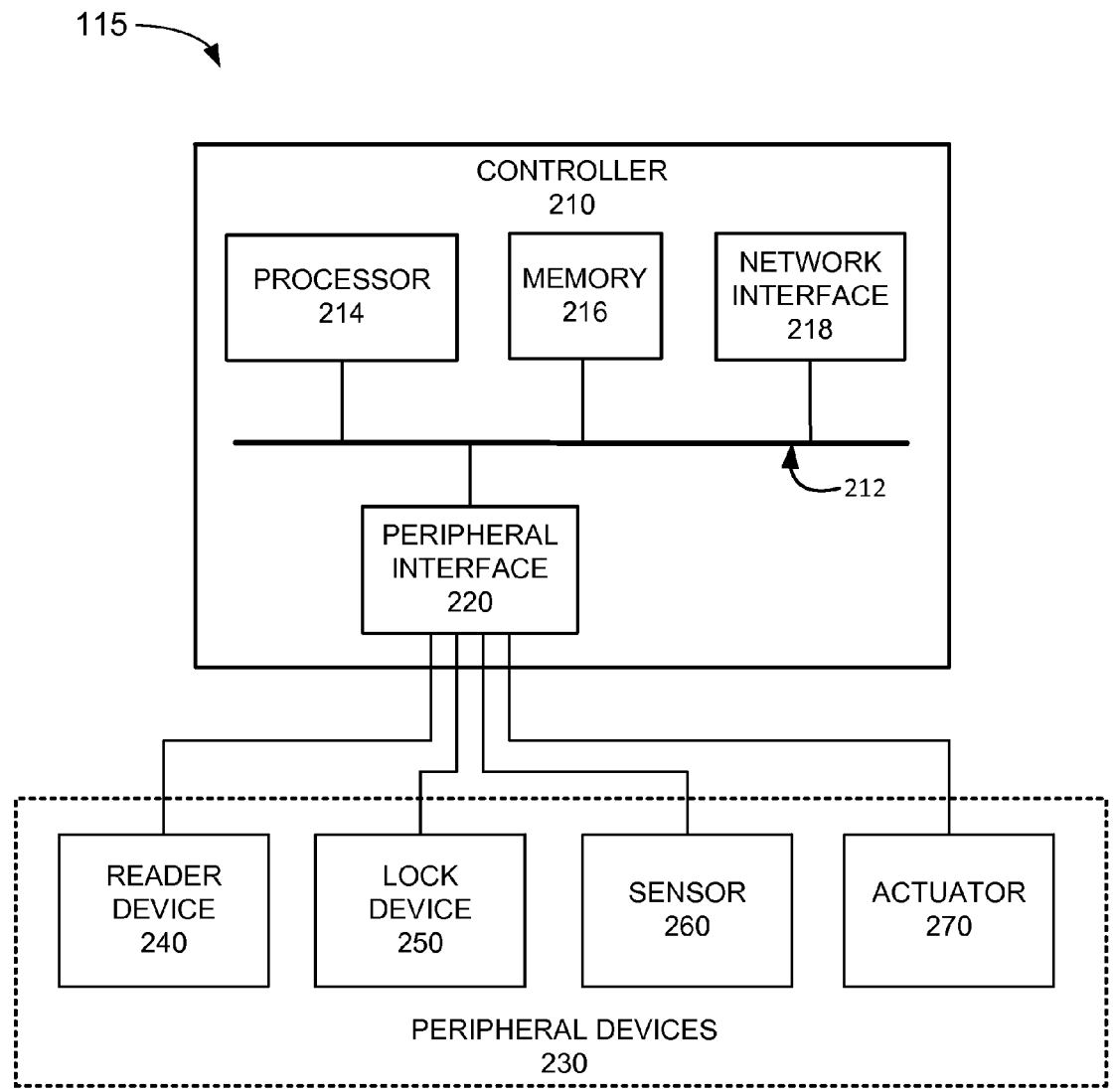
FIG. 2 is a block diagram illustrating exemplary components of a system unit of FIG. 1.

FIG. 2 is a block diagram illustrating exemplary components of a system unit 115. As shown in FIG. 2, system unit 115 may include a controller 210 and one or more peripheral devices 230. Controller 210 may control the operation of system unit 115, may communicate with other system units 115, may communicate with administration device 130, and/or may control peripheral devices 230. Controller 210 may include a bus 212, a processor 214, a memory 216, a network interface 218, a peripheral interface 220, and a housing 222.

Bus 212 may include a path that permits communication among the components of controller 210. Processor 214 may include any type of single-core processor, multi-core processor, microprocessor, latch-based processor, and/or processing logic (or families of processors, microprocessors, and/or processing logics) that interprets and executes instructions. In other embodiments, processor 214 may include an application-specific integrated circuit (ASIC), a field-programmable gate array (FPGA), and/or another type of integrated circuit or processing logic.

Memory 216 may include any type of dynamic storage device that may store information and/or instructions, for execution by processor 214, and/or any type of non-volatile storage device that may store information for use by processor 214. For example, memory 216 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 218 may include a transceiver (e.g., a transmitter and/or a receiver) that enables controller 210 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radiofrequency (RF), infrared, and/or visual optics, etc.), or a combination of wireless and wired communication links. Network interface 218 may include a transmitter that converts baseband signals to RF signals and/or a receiver that converts RF signals to baseband signals. Network interface 218 may be coupled to an antenna for transmitting and receiving RF signals.

Network interface 218 may include a logical component that includes input and/or output ports, input and/or output systems, and/or other input and output components that facilitate the transmission of data to other devices. For example, network interface 218 may include a network interface card (e.g., Ethernet card) for wired communications and/or a wireless network interface (e.g., a WiFi) card for wireless communications. Network interface 218 may also include a universal serial bus (USB) port for communications over a cable, a Bluetooth™ wireless interface, a radiofrequency identification (RFID) interface, a near-field communications (NFC) wireless interface, and/or any other type of interface that converts data from one form to another form.

Peripheral interface 220 may be configured to communicate with one or more peripheral devices 230. For example, peripheral interface 220 may include one or more logical components that include input and/or output ports, input and/or output systems, and/or other input and output components that facilitate the transmission of data to peripheral devices 230. As an example, peripheral interface 220 may communicate with peripheral devices using a Serial Peripheral Interface Bus protocol, such as a Wiegand protocol, an RS-485 protocol, and/or another type of protocol. As another example, peripheral interface 220 may use a different type of protocol. In one embodiment, network interface 218 may also act as a peripheral interface for coupling peripherals 230 to controller 210.

Housing 222 may enclose the components of controller 210 and may protect the components of controller 210 from the environment. In one embodiment, housing 222 may include one or more of peripheral devices 230. In another embodiment, housing 222 may include administration device 130. Housing 222 may define the boundaries of one system unit 115 and/or controller 210 from other system units 115 and/or controllers 210 in a system with more than one system units 115 and/or controllers 210.

As described below, controller 210 may perform certain operations relating to managing databases in a distributed system. Controller 210 may perform these operations as a result of hardwired circuitry of an ASIC. Controller 210 may also (or alternatively) perform these operations in response to processor 214 executing software instructions contained in a computer-readable medium, such as memory 216. A computer-readable medium may be defined as a non-transitory memory device. A memory device may be implemented within a single physical memory device or spread across multiple physical memory devices. The software instructions may be read into memory 216 from another computer-readable medium or from another device. The software instructions contained in memory 216 may cause processor 214 to perform processes described herein. Thus, implementations described herein are not limited to any specific combination of hardware circuitry and software.

Peripheral devices 230 may include one or more devices that provide information to controller 210, that are controlled by controller 210, and/or that otherwise communicate with controller 210. For example, peripheral devices 230 may include a reader device 240, a lock device 250, a sensor 260, and/or an actuator 270. While a single reader device 240, a single lock device 250, a single sensor 260, and a single actuator 270 are shown in FIG. 2 for illustrative purposes, in practice, peripheral devices 230 may include multiple reader devices 240, multiple lock devices 250, multiple sensors 260, and/or multiple actuators 270. In some implementations, peripheral devices 230 may not include one or more of the devices shown in FIG. 2. Additionally or alternatively, peripheral devices 230 may include any other type of security device not shown in FIG. 2.

Reader device 240 may include a device that reads credentials from a user and provides the credentials to controller 210. For example, reader device 240 may include a keypad configured to receive an alphanumeric personal identification number (PIN) from a user; a card reader to configure a card that stores a card code on a magnetic strip or another type of storage device, such as an RFID tag; a fingerprint reader configured to read a user's fingerprint; an iris reader configured to read a user's iris; a microphone and a voice signature identifier configured to record a user's voice signature; a near field communication (NFC) reader; and/or another type of reader device. Reader device 240 may include any type security device that can provide credentials, and may include one or more sensor devices, such any sensor device described below with reference to sensor 260. For example, reader device 240 may include a camera used for facial recognition and/or a microphone used for voice recognition.

Lock device 250 may include a lock controlled by controller 210. Lock device 250 may lock a door (e.g., prevent it from opening or closing), a window, an HVAC vent, and/or another type of access opening to a secure area. For example, lock device 250 may include an electromagnetic lock; a mechanical lock with a motor controlled by controller 210; an electromechanical lock; and/or another type of lock. Furthermore, lock device 250 may lock/unlock operation of a machine, transport vehicle, elevator, and/or an electrical device.

Sensor 260 may include a sensor device. As examples, sensor 260 may include a door sensor to sense whether a door is open or closed; a visible light monitoring camera, an infrared (IR) light monitoring camera, a heat signature monitoring camera, and/or another type of monitoring device; an alarm sensor, such as a motion sensor, a heat sensor, a pressure sensor, and/or another type of alarm sensor; an audio recording device (e.g., microphone); a tamper sensor, such as a position sensor located inside system unit 115; and/or a "request to exit" button located within a secured area associated with system unit 115; and/or another type of sensor device.

Actuator 270 may include an actuator device. As an example, actuator 270 may control an illumination device. As other examples, actuator 270 may include a burglar alarm activator; a speaker to play messages or generate alarm signals; a display device; a motor to move sensor 260 (e.g., control the field of view of a camera or other monitoring device); a motor for opening/closing a door, window, HVAC vent, and/or another opening associated with a secure area; a motor to secure lock device 250 in a locked or unlocked position; a fire extinguishing device; and/or another type of actuator device.

Although FIG. 2 shows exemplary components of system unit 115, in other implementations, system unit 115 may include fewer components, different components, additional components, or differently arranged components than depicted in FIG. 2. Additionally or alternatively, any component of system unit 115 (or any group of components) may perform the task or tasks described as performed by one or more other components of system unit 115. For example, in some implementations, peripheral interface 220 may correspond to a network interface. As another example, in some implementations, peripheral devices 230 may be connected to controller 210 via network interface 218, rather than via peripheral interface 220.

Further, although DCS 110 may include a physical access distributed control system, other implementations may control systems other than physical access systems. On the other hand, DCS 110 may include any type of physical access control systems (e.g., in an operational environment), such as a control system for opening and/or closing a door or controlling physical access to a building or facility. DCS 110 may also include a system to control a fan (e.g., start or stop), to initiate an alarm in a building management system (e.g., failed authentication, successful authentication, etc.), or to control a robot arm in an industrial automation system.

Figure 3A:
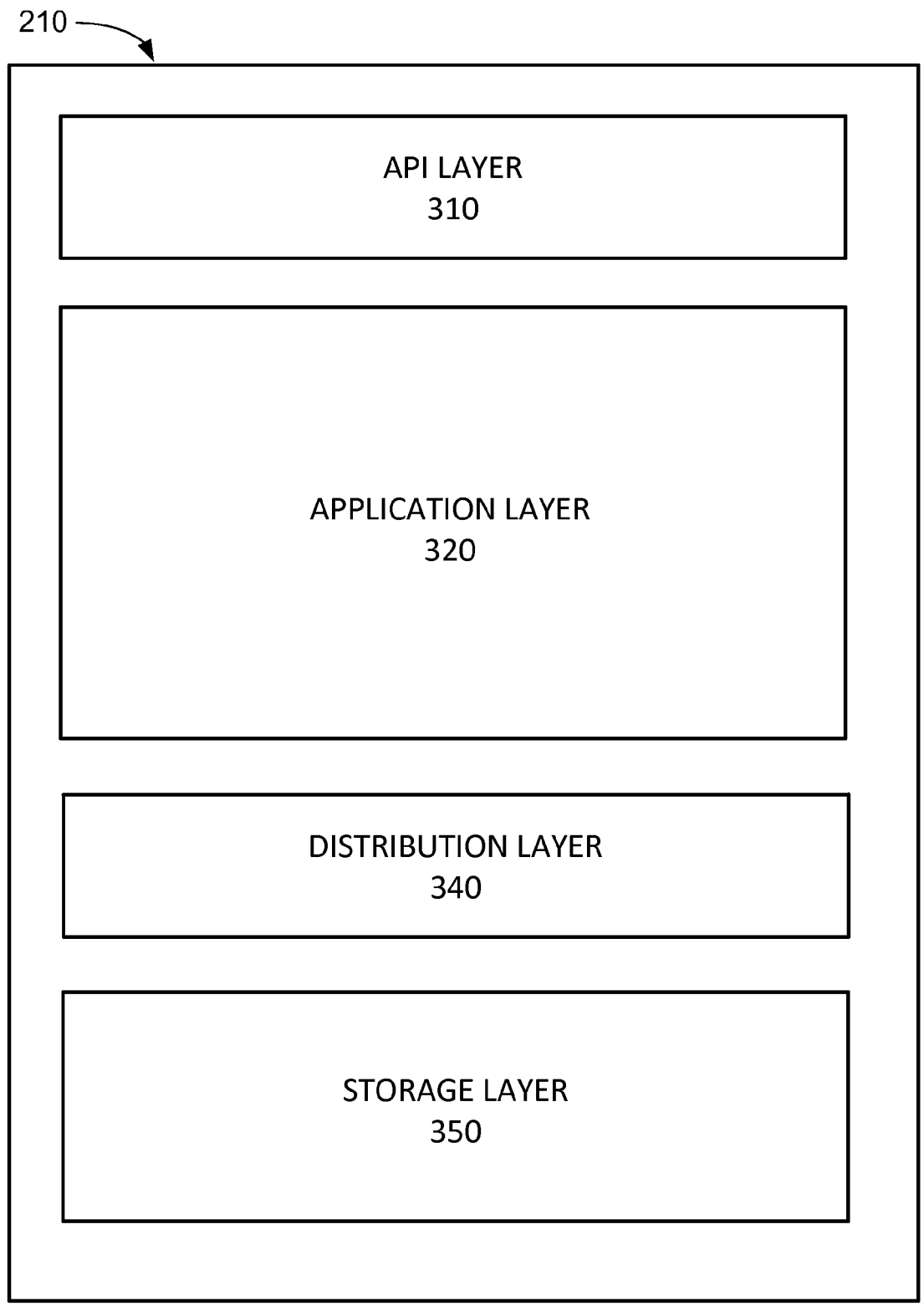
FIGS. 3A and 3B are block diagrams illustrating exemplary functional components of the system unit of FIG. 1.
Figure 3B:
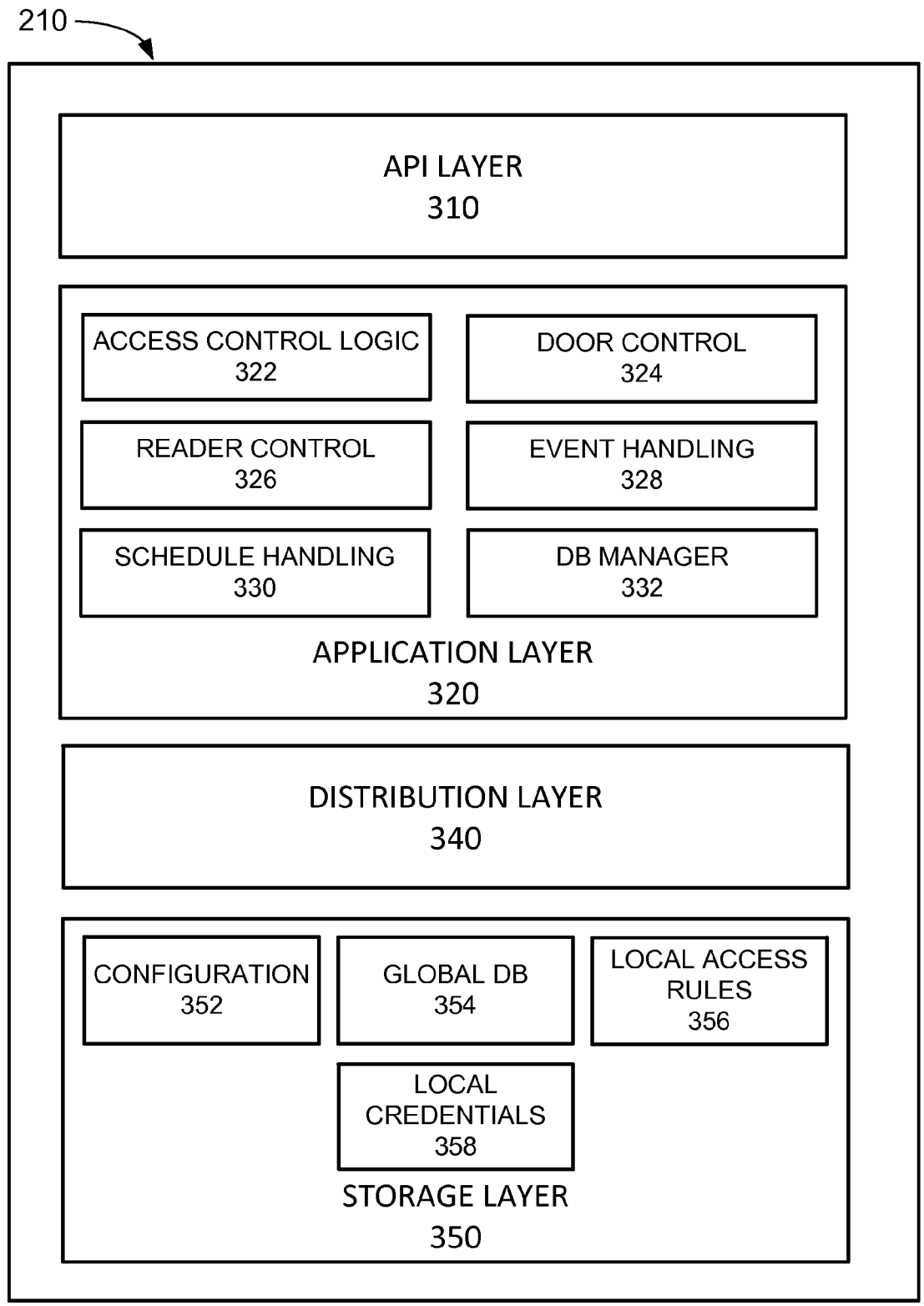

FIGS. 3A and 3B are block diagrams illustrating exemplary functional components of system unit 115. The functional components of system unit 115 may be implemented, for example, via hard-wired circuitry of one or more ASICs. Additionally or alternatively, the functional components of system unit 115 may be implemented by processor 214 executing instructions from memory 216. FIG. 3A illustrates the functional layers of system unit 115. As shown in FIG. 3A, system unit 115 may include an application programming interface (API) layer 310, an application layer 320, a distribution layer 340, and a storage layer 350.

API layer 310 includes an API configured to communicate with, for example, administration device 130. As an example, when an administrator uses administrator device 130 to log into system unit 115, API layer 310 may communicate with administrator device 130 to authenticate the administrator. As another example, API layer 310 may communicate with administrator device 130 to change a configuration of system unit 115. API layer 310 may receive data from administrator device 130 and provide the data to distribution layer 340 and/or to storage layer 350. API layer 310 may also communicate with administrator device 130 to install an application in application layer 320. API layer 310 may be configured to handle different administrator types. For example, API layer 310 may include an API to handle a Web Services administrator, a Linux administrator, an Open Network Video Interface Forum (ONVIF) administrator, and/or another type of API.

Application layer 320 includes one or more applications installed on system unit 115. FIG. 3B shows exemplary applications. As shown in FIG. 3B, application layer 320 may include an access control logic application 322, a door control application 324, a reader control application 326, an event handling application 328, a schedule handling application 330, and/or a database manager application 332.

Access control logic application 322 may determine whether to grant access based on received credentials and based on stored access rules. Door control application 324 may control one or more doors and/or associated lock devices 250. For example, door control application 324 may determine whether a door is open or closed and/or locked or unlocked and may operate one or more device to open or close the door and/or to lock or unlock the door. Reader control application 326 may control one or more reader devices 240 and may obtain and process credentials received from the one or more reader devices 240. Event handling application 328 may maintain a log of events recorded or generated by system unit 115 and/or recorded by another system unit 115. Event handling application 328 may ensure that locally recorded or generated events are distributed to other system units 115 in DCS 110 in order to maintain a distributed system event log in all (or at least some) system units 115. Thus, logged events may be retrieved from any system unit 115 that is associated with the system event log. Schedule handling application 330 may manage one or more schedules associated with system unit 115. For example, access rules for particular groups of users may change based on particular times of day.

Database manager application 332 may derive local access rules database 356 and/or local credentials table 358 from global database 354. In some implementations, system unit 115 may not include global database 354. For example, database manager application 332 may access global database 354 at another device, such as at another system unit 115 or at administration device 130. In still other implementations, local access rules database 356 and/or local credentials table 358 may be derived from global database 354 at another system unit 115 and provided to system unit 115.

Other applications (not shown in FIG. 3B) may be included in application layer 320. As an example, an alarm application may generate a report and/or an alarm and send the report and/or alarm to administrator device 130 (and/or to another designated device) and/or one or more other system units 115. As another example, a task-specific control application may process events associated with system unit 115, such as door opening events, sensor events, actuator events, and/or other types of events.

Distribution layer 340 may manage one or more distributed datasets associated with system unit 115. For example, distribution layer 340 may maintain secure connections with other system units 115 over network 120. (e.g., a Transport Layer Security (TLS) connection). Furthermore, distribution layer 340 may use a protocol (e.g., a PAXOS protocol) to establish a consensus with respect to a change in a particular consensus-based distributed dataset. As an example, distribution layer 340 may send a proposal for a change to other system units 115 associated with the distributed dataset and may receive a quorum for the change from the other system units 115. As another example, distribution layer 340 may vote for a proposal received from another system unit 115. As yet another example, distribution layer 340 may receive an indication that a consensus has been reached for a change without having voted for the change. When an indication of consensus for a change is received, distribution layer 340 may make the change in the local copy of the distributed dataset.

Storage layer 350 stores one or more datasets associated with system unit 115. A dataset stored in storage layer 350 may correspond to a local dataset or may correspond to a distributed dataset. A local dataset may store information associated with (and/or only associated with) the particular system unit 115 that stores the local dataset. A distributed dataset may store information associated with other system units 115 associated with the distributed dataset.

Exemplary information that may be included in storage layer 350 is shown in FIG. 3B. As shown in FIG. 3B, storage layer 350 may include a configuration database 352, a global database 354, a local access rules database 356, and a local credentials database 358.

Configuration database 352 may store configuration data associated with a particular system unit 115, such as hardware configuration of controller 210, peripheral devices 230 connected to controller 210, application installed in application layer 320, and/or other types of configuration information. Configuration database 352 may store a list of access entities associated with system unit 115.

Global database 354 may store a global database associated with DCS 110. Exemplary information that may be stored in global database 354 is described below with reference to FIG. 4A. Local access rules database 356 may store access rules associated with system unit 115. Exemplary information that may be stored in local access rules database 356 is described below with reference to FIG. 4B. Local credentials database 358 may store local credentials associated with system unit 115. Exemplary information that may be stored in local credentials database 358 is described below with reference to FIG. 4C.

Although FIGS. 3A and 3B show exemplary functional components of system unit 115, in other implementations, system unit 115 may include fewer functional components, different functional components, differently arranged functional components, or additional functional components than depicted in FIGS. 3A and 3B. Additionally, any one of the components (or any group of components) of system unit 115 may perform functions described as performed by one or more other functional components of system unit 115.

Figure 4A:
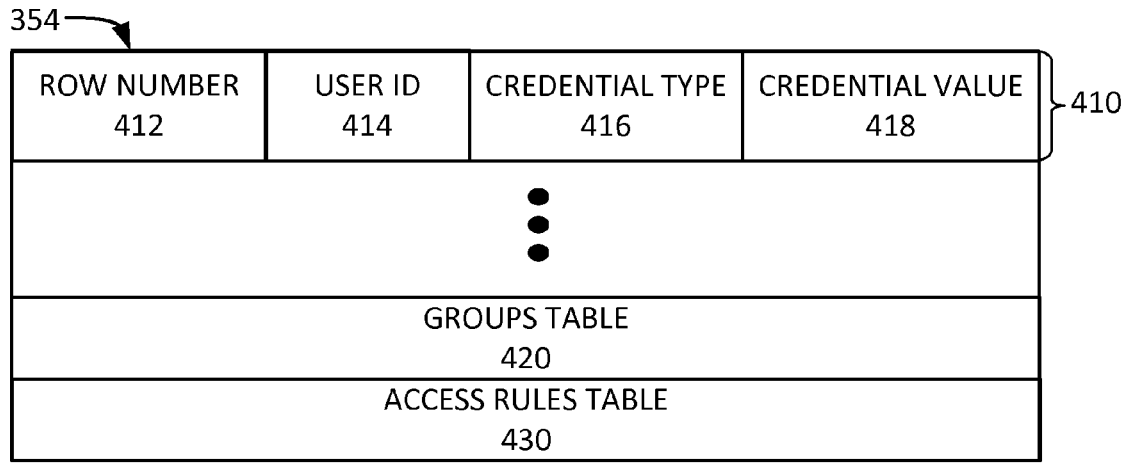
FIGS. 4A-4C are diagram of exemplary information that may be stored in the databases of FIG. 3B.

FIG. 4A is a diagram of exemplary information that may be stored in global database 354. As shown in FIG. 4A, global database 354 may include one or more global database entries 410, a groups table 420, and an access rules table 430. Each global database entry 410 may store information for a particular user. Global database entry 410 may include a row number field 412, a user identification (ID) field 414, a credential type field 416, and a credentials value field 418.

Row number field 412 may include a particular row for a user in global database 354. In some implementations, identical row numbers may be used for a user in multiple databases/tables. Using identical row numbers for a user across multiple databases/tables may simplify processing and retrieval of information. User ID field 414 may store identification information associated with a user, such as the user's name, employee number, contact information, and/or other types of user information. Credential type field 416 may identify a particular credential type associated with the user, such as card credential type, a personal identification number (PIN) type, an iris scan type, a fingerprint type, a voice signature type, and/or another credential type. Credential value 418 may store a credential value associated with credential type, such as an access card value, a PIN value, iris scan data, fingerprint data, voice signature data, and/or data for another type of credential type. A user may be associated with multiple credential types. In some implementations, each credential type may be assigned a separate row in the global database 354. In other implementations, multiple credential types may be stored in the same row.

Groups table 420 may include a table that identifies particular groups of users along with particular users that belong to each group. For example, groups table 420 may identify a group of users that are engineers, a secretarial staff group of users, a group of users that are technicians, etc. Each group may be associated with particular access rules. Access rules table 430 may store access rules for groups of users.

Although FIG. 4A show exemplary fields that may be stored in global database 354, in other implementations, global database 354 may include fewer fields, different fields, differently arranged fields, or additional fields than depicted in FIG. 4A.

Figure 4B:
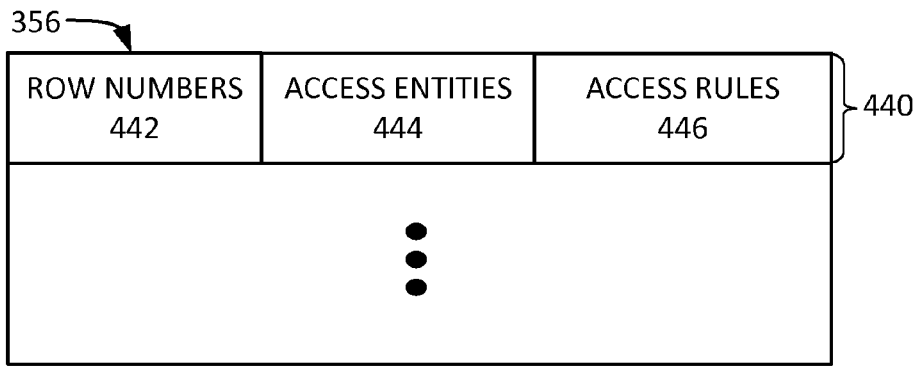

FIG. 4B is a diagram of exemplary information that may be stored in local access rules database 356. As shown in FIG. 4B, local access rules database 356 may include one or more access rules entries 440. Each access rule entry 440 may store access rules information one or more users in connection with one or more access entities. Access rule entry 440 may include a row numbers field 442, an access entities field 444, and an access rules field 446.

Row numbers field 442 may identify one or more row numbers, corresponding to users in global database 354, associated with a particular access rule. In some implementations, row numbers field 442 may identify a particular user group. In other implementations, row numbers field 442 may store other types of anonymous information corresponding to users in global database 354 (e.g., a string of characters assigned to a user in global database 354). Thus, information identifying a user may not be stored in local access rules database 356 and local access rules database 356 may correspond to an anonymous database. Access entities field 444 may identify one or more access entities associated with the particular access rule. An access entity may correspond to a particular area, such as a particular room; a particular access opening, such as a door, window, HVAC vent, and/or another type of opening; a machine, transport vehicle, elevator, and/or an electrical device; and/or another type of access entity. In some implementations, access entities field 444 may identify a particular lock device 250 associated with the access entity.

Access rules field 446 may store one or more access rules associated with the access entity and the group of users. An access rule may specify the type of credentials required to grant access, may specify particular times during which access should be granted, and/or may specify other conditions that need to be satisfied in order to grant access (e.g., a particular state associated with system unit 115). As example, an access rule may grant access to the particular access entity to all users during a fire alarm event. As another example, an access rule may deny access to all users if system unit 115 detects a security breach. As yet another example, an access rule may grant access to a first door only if a second door, associated with a same or another system unit 115, is closed.

Although FIG. 4B show exemplary fields that may be stored in local access rules database 356, in other implementations, local access rules database 356 may include fewer fields, different fields, differently arranged fields, or additional fields than depicted in FIG. 4B.

Figure 4C:
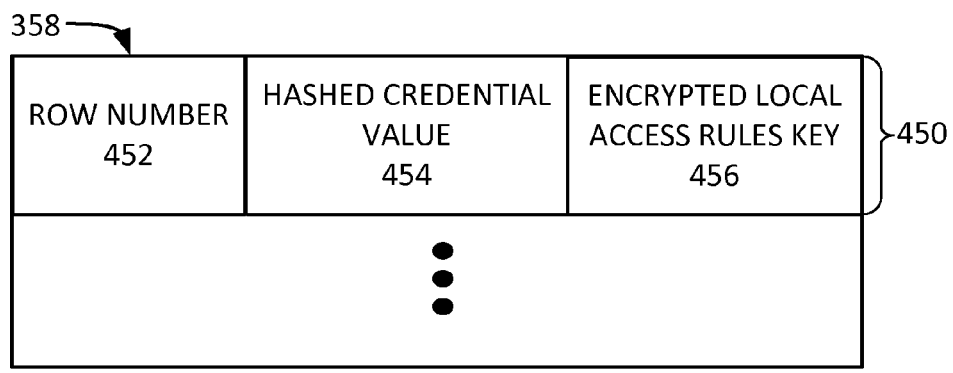

FIG. 4C is a diagram of exemplary information that may be stored in local credentials database 358. As shown in FIG. 4C, local credentials database 358 may include one or more credential entries 450. Each credential entry 450 may store information for a particular credential associated with a particular user. Thus, a particular user may be associated with multiple credential entries 450.

Row number 452 may identify a particular row number in global database 354 that is associated with the particular user. Thus, information identifying a user may not be stored in local credentials database 358 and local credentials database 358 may correspond to an anonymous database. Hashed credentials value 454 may store a particular hashed credentials value associated with the particular user. Thus, the actual credentials value may not be stored in local credentials database 358. Encrypted local access rules key 456 may store a local access rules key to local access rules table 356, which may be encrypted. The local access rules key may be unencrypted with an unhashed credentials value, without storing the unhashed credentials value in persistent memory. When reader device 240 obtains a credentials value from a user, the credentials value may be hashed and the hashed credentials value may be used to identify a credential entry 450. The unhashed credentials value may then be used to decrypt the encrypted local access rules key and the decrypted local access rules key may be used to decrypt the local access rules table. Since the unhashed credentials values are not stored by system unit 115, if the security of system unit 115 is compromised, the unhashed credentials value cannot be retrieved from a compromised system unit 115.

Although FIG. 4C show exemplary fields that may be stored in local credentials database 358, in other implementations, local credentials database 358 may include fewer fields, different fields, differently arranged fields, or additional fields than depicted in FIG. 4C.

Figure 5:
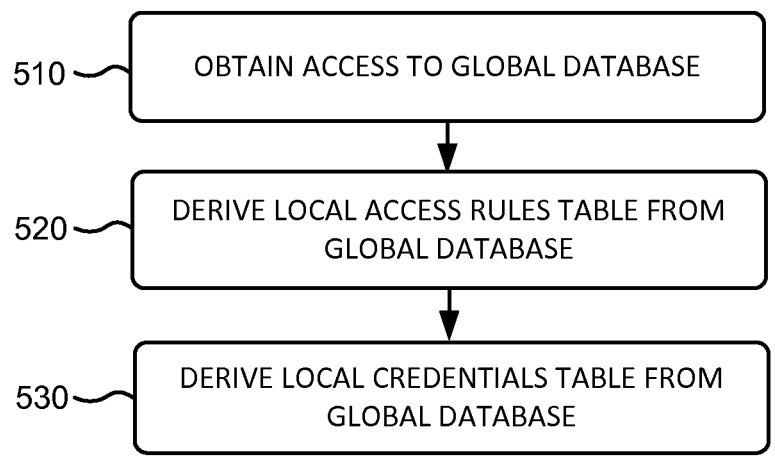
FIG. 5 is a flowchart for deriving local databases from a global database according to one or more embodiments.

FIG. 5 is a diagram of a flowchart for deriving local databases from a global database according to one or more embodiments. In some implementations, the process of FIG. 5 may be performed by controller 210. In other implementations, some or all of the process of FIG. 5 may be performed by another device or a group of devices separate from controller 210 and/or including controller 210.

The process of FIG. 5 may include obtaining access to a global database (block 510). In some implementations, system unit 115 may include an encrypted copy of the global database. In order to obtain access to the global database, controller 210 may need to obtain a password from administrator device 130. The obtained password may be used to derive a key to decrypt the global database. In other implementations, the global database may be stored in another system unit 115 and the other system unit 115 may obtain the password and decrypt the global database. Controller 210 may then access the decrypted global database at the other system unit 115. In yet other implementations, the global database may be maintained by administration device 130 (and/or another device not part of DCS 115) and controller 210 may access the global database at administration device 130. A local access rules table may be derived from the global database (block 520). For example, database manager application 332 may access configuration database 352 to identify which access entities are associated with system unit 115 and may obtain access rules, from access rules table 430, which are relevant to the identified access entities. Database manager application 332 may generate local access rules database 356 based on the information obtained from access rules table 430. Database manager application 332 may generate a local access rules key and may encrypt the local access rules database 356 with the generated local access rules key.

A local credentials table may be derived from the global database (block 530). For example, database manager application 332 may access the generated local access rules database 356 to determine which users are associated with access rules included in the local access rules database 356 and which credential types for each user are required for access based on the access rules. Database manager application 332 may generate a row for each user and may obtain the credentials value for each user, and for each credential type associated with the user, from the global database. The credentials value may be used to encrypt the local access rules key and the encrypted local access rules key may be stored in the row associated with the user. Furthermore, the credentials value may be hashed using a one-way hash, such as a SHA-256 hash, which generated a 256 bit hashed value for an input of any length. In other implementations, a different type of hashing process may be used.

In other implementations, system unit 115 does not obtain the credential value and local credentials table is generated remotely by, for example, another system unit 115 or by administration device 130. As an example, in some implementations, a first system unit 115 may include global database 354 and a second system unit 115 may not include global database 354. First system unit 115 may derive a first local access rules table 356 and a first local credentials table 358 for first system unit 115. First system unit 115 may further derive a remote local access rules table 356 and a remote local credentials table 358 for second system unit 115. In some implementations, first system unit 115 may provide the remote local access rules table 356 and the remote local credentials table 358 to second system unit 115. In other implementations, first system unit 115 may maintain the remote local access rules table 356 and the remote local credentials table 358 and second system unit 115 may need to access the remote local access rules table 356 and the remote local credentials table 358 at first system unit 115.

Figure 6:
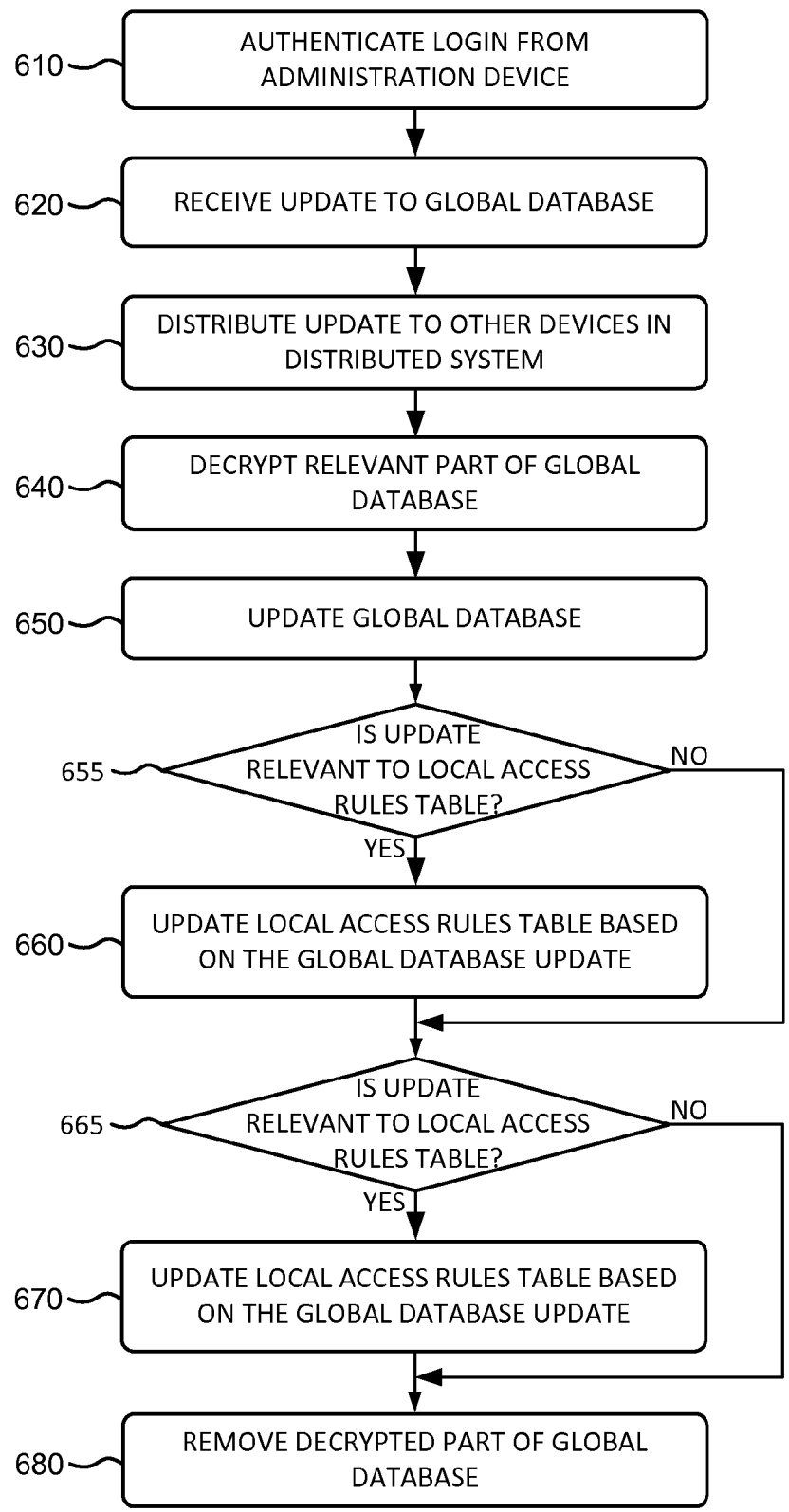
FIG. 6 is a flowchart for updating a global database according to one or more embodiments.

FIG. 6 is a diagram of a flowchart for updating a global database according to one or more embodiments. In FIG. 6, the global database is configured as a distributed dataset in which an encrypted version of the global database is stored system units 115 which are associated with the distributed dataset. In some implementations, the global database may be distributed in all system units 115. In other implementations, some system units 115 may not be associated with the global database distributed dataset and thus may not include a copy of the global database. In some implementations, the process of FIG. 6 may be performed by controller 210. In other implementations, some or all of the process of FIG. 6 may be performed by another device or a group of devices separate from controller 210 and/or including controller 210.

The process of FIG. 6 may include authenticating a login from an administration device (block 610). For example, an administrator may determine that global database 354 needs to be updated. For example, the administrator may need to add a user, change a user's credentials, change an access rule for a particular access entity, etc. The administrator may log into a particular system unit 115 using a password supplied by the administrator. An update to the global database may be received (block 620) and distributed to other devices in the distributed system (630). For example, system unit 115 may receive an update for global database 354 from administration device 354 and distribution layer 340 may distribute the update to the local copies of global database 345 in other system units 115 in DCS 110.

A relevant part of the global database may be decrypted (block 640) and the global database may be updated (block 650). The update may be used to determine which part of global database 354 needs to be decrypted. For example, an update for a particular row number 412 may only require that a part of global database 354 that includes the particular row number 412 needs to be decrypted. Similarly, an update to groups table 420 or access rules table 430 may only require decryption of groups table 420 or access rules table 430, respectively. Global database 354 may be encrypted with a global database key derived from an administration password and an administration password received from administration device 130 may be received, used to derive the global database key, and the global database key may be used to decrypt the determined relevant part of global database 354. After decryption, global database 354 may be updated based on the received update. Similarly, the update may be performed on the local copies of global database 354 at the other system units 115 to which the update has been distributed.

A determination may be made as to whether the update is relevant to the local access rules table (block 655). For example, database manager application 332 at each particular system unit 115 that received the update may determine whether the update included an access entity associated with the particular system unit 115. If the update is relevant to the local access rules table (block 655—YES), local access rules database 356 may be updated at the particular system unit 115 (block 660). If the update is not relevant to the local access rules table (block 655—NO), processing may continue to block 665.

A determination may be made as to whether the update is relevant to the local credentials table (block 665). For example, database manager application 332 at each particular system unit 115 that received the update may determine whether the update included a user included in local access rules database 356 of the particular system unit 115. If the update is relevant to the local credentials table (block 665—YES), local credentials database 358 may be updated at the particular system unit 115 (block 670). If the update is not relevant to the local credentials table (block 665—NO), processing may continue to block 680. In other implementations, local access rule tables and/or local credential tables may include information for all users of DCS 110, rather than for users relevant to a particular system unit 115.

After any updates, the decrypted part of the global database may be removed (block 680). For example, database manager application 332 at each particular system unit 115 may de-allocate the memory space that was used to store the decrypted part of global database 354. In some implementations, the de-allocated memory space may additionally be wiped clean.

Figure 7:
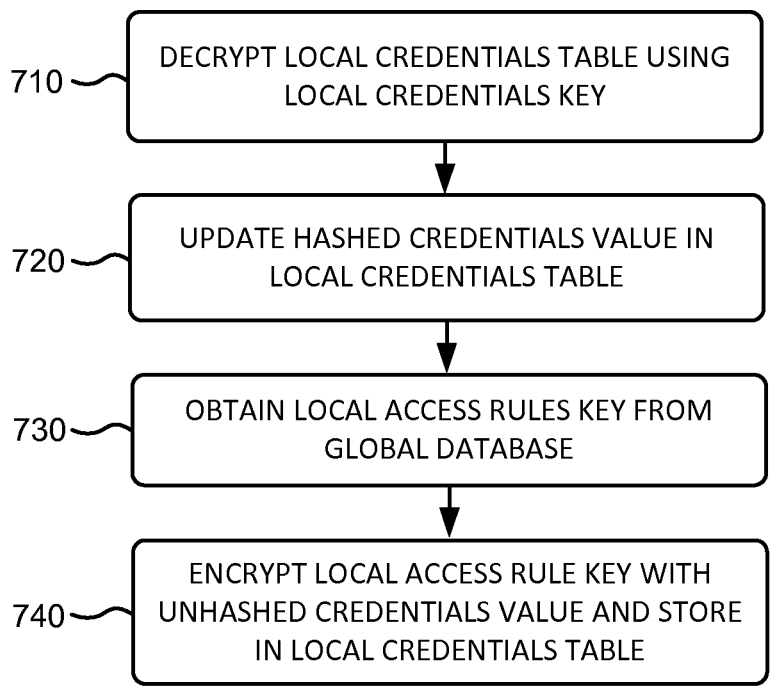
FIG. 7 is a diagram of a flowchart for updating a local access rule table according to one or more embodiments.

FIG. 7 is a diagram of a flowchart for updating a local access rule table according to one or more embodiments. In some implementations, the process of FIG. 7 may be performed by controller 210. In other implementations, some or all of the process of FIG. 7 may be performed by another device or a group of devices separate from controller 210 and/or including controller 210.

The process of FIG. 7 may include decrypting a local credentials table using a local credentials key (block 710). For example, local credentials table 358 may be locally encrypted using a local credentials key and may be decrypted in order to perform an update. A hashed credentials value may be updated in the local credentials table (block 720). For example, if the update changes a credentials value for a user, a new hashed credentials value may be generated and stored in hashed credentials value field 454 associated with the user. If a credentials value is changed, the local access rules key may also be re-encrypted with the new credentials value. Thus, a local access rules key may be obtained from the global database (block 730) and the local access rules key may be encrypted with the unhashed credentials value and stored in the local credentials table (block 740).

Figure 8:
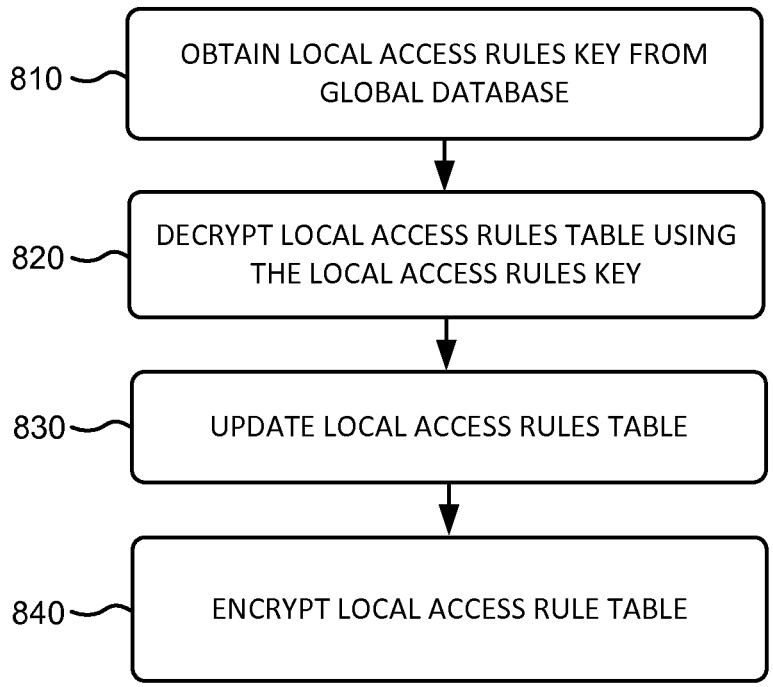
FIG. 8 is a diagram of a flowchart for updating a local credentials table according to one or more embodiments.

FIG. 8 is a diagram of a flowchart for updating a local credentials table according to one or more embodiments. In some implementations, the process of FIG. 8 may be performed by controller 210. In other implementations, some or all of the process of FIG. 8 may be performed by another device or a group of devices separate from controller 210 and/or including controller 210.

In order to update local access rules database 356, local access rules database 356 may need to be decrypted. However, since the local access rules key is only stored in an encrypted version, with credential values of users, in local credentials database 358, the local access rules key may need to be obtained from the global database. Thus, the process of FIG. 8 may include obtaining a local access rules key from the global database (block 810) and decrypting the local access rules table with the local access rules key (block 820). The local access rules table may be updated (block 830) and encrypted (block 840). After the local access rules table is encrypted, the unencrypted version of the local access rules key may be deleted from system unit 115.

Figure 9:
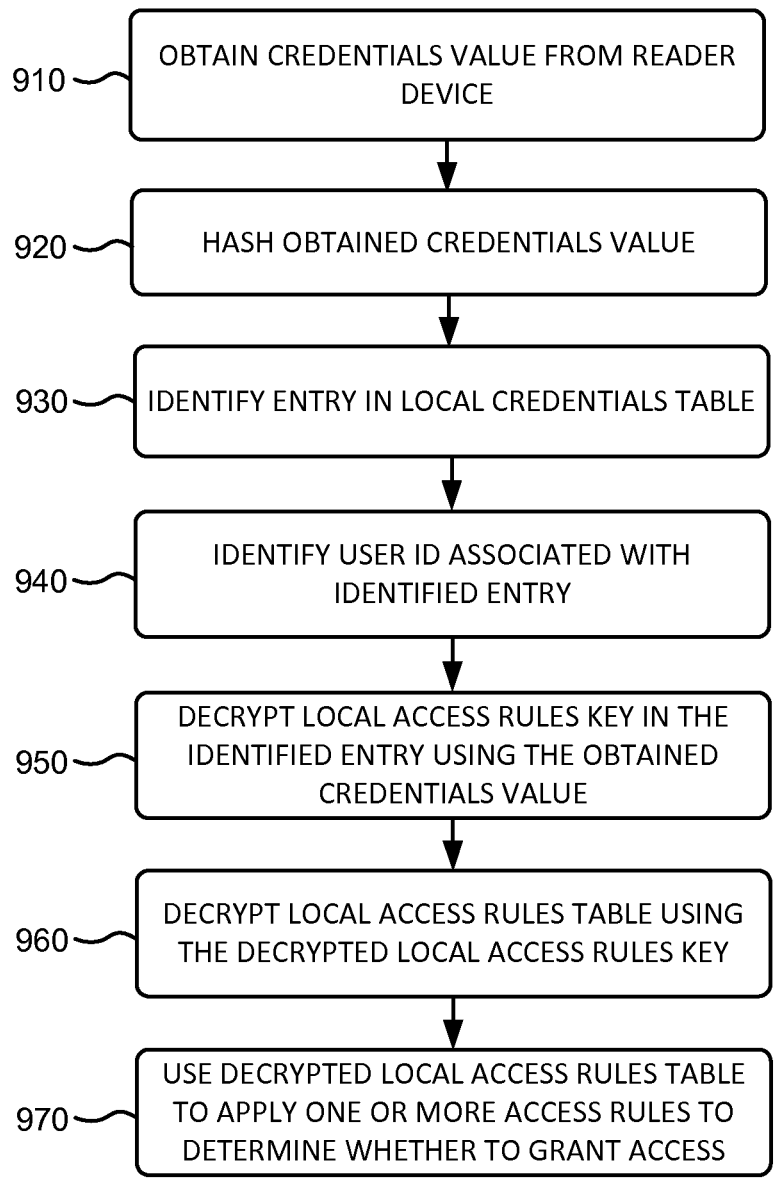
FIG. 9 is a flowchart for using a local credentials table and a local access rules table according to one or more implementations described herein.

FIG. 9 is a diagram of a flowchart for using a local credentials table and a local access rules table according to one or more embodiments. In some implementations, the process of FIG. 9 may be performed by controller 210. In other implementations, some or all of the process of FIG. 9 may be performed by another device or a group of devices separate from controller 210 and/or including controller 210.

The process of FIG. 9 may include obtaining a credentials value from a reader device (block 910). For example, a user may request access to an access entity by providing credentials to reader device 240. The user may perform one or more of entering a sequence of keypad characters into a key pad, placing an access card in the proximity of a card reader, placing an iris in front of an iris scan reader, placing a finger on a fingerprint scanner, speaking into a microphone to provide a voice sample, facing a camera that is associated with facial recognition software, and/or providing another type of credentials value. Reader device 240 may provide a credentials value to controller 210 may providing a PIN from a keypad, a card value from a card reader, a feature vector obtained from an iris scan, a feature vector obtained from a fingerprint scan, a feature vector extracted from a voice sample, a facial recognition ID obtained from facial recognition software, and/or another type of credentials value. The obtained credentials value may be associated with a particular access entity (e.g., a particular door controlled by controller 210).

The obtained credentials value may be hashed and an entry may be identified in the local credentials table (block 920). For example, access control logic 322 may hash the obtained credentials value and may attempt to locate a credentials entry 450 in local credentials database 358 that matches the hashed credentials value. If a matching entry is not found, access may be denied. Additionally or alternatively, if a matching entry is not found, an alarm, an error message to the user, and/or another type of event may be generated. Furthermore, in some situations, access may be granted even if a matching entry is not found, and an alarm, a log event, and/or another type of event may be generated in connection with the granted access.

If a matching entry is found, a used ID associated with the matched entry may be identified (block 940). For example, access control logic 322 may identify the row number associated with the identified local credentials entry 450. The row number may be used to identify an entry for the user in the local access rules database 358.

The local access rules key stored in the identified credentials entry 450 may be decrypted using the obtained unhashed credentials value (block 950) and the local access rules table may be decrypted with the decrypted local access rules key (block 960). For example, access control logic 322 may decrypt the local access rules key with the unhashed credentials value. The unhashed credentials value may not be stored by system unit 115. For example, the unhashed credentials value may be obtained from reader device 240, used to decrypt the local access rules key, and then deleted from system unit 115. Access control logic 322 may then decrypt local access rules database 356 with the decrypted local access rules key. The decrypted local access rules table may be used to apply one or more access rules to determine whether to grant access (block 970). For example, access control logic 322 may determine whether an entry exists for the identified user in local access rules database 356. If no entry exists for the identified user, access may be denied. If an entry is identified for the user, for the access entity associated with the obtained credentials value, a determination may be made as to whether the access rules grant access to the user. As an example, the access rules may specify that the user is to be granted access if a particular combination of credentials values is received (e.g., a card value and a PIN). As another example, the access rules may specify that the user is to be granted access during particular times of day and/or particular days of the week. As yet another example, the access rules may specify that the user is to be granted access only if another user is present (e.g., based on credentials values received from the other user). As yet another example, the access rules may specify that the user is to be granted access only if another device is in a particular condition (e.g., door sensor associated with another system unit 115 indicates a door is closed). If the user is granted access, door control logic application 324 (and/or another access control application) may unlock lock device 250, may operate an actuator device 270 to open a door, activate a particular device, such as an elevator, etc. In some implementations, if an access rule is not satisfied, the user may be provided with a message that explains why access was not granted, based on information stored in local access rules database 356.

Figure 10:
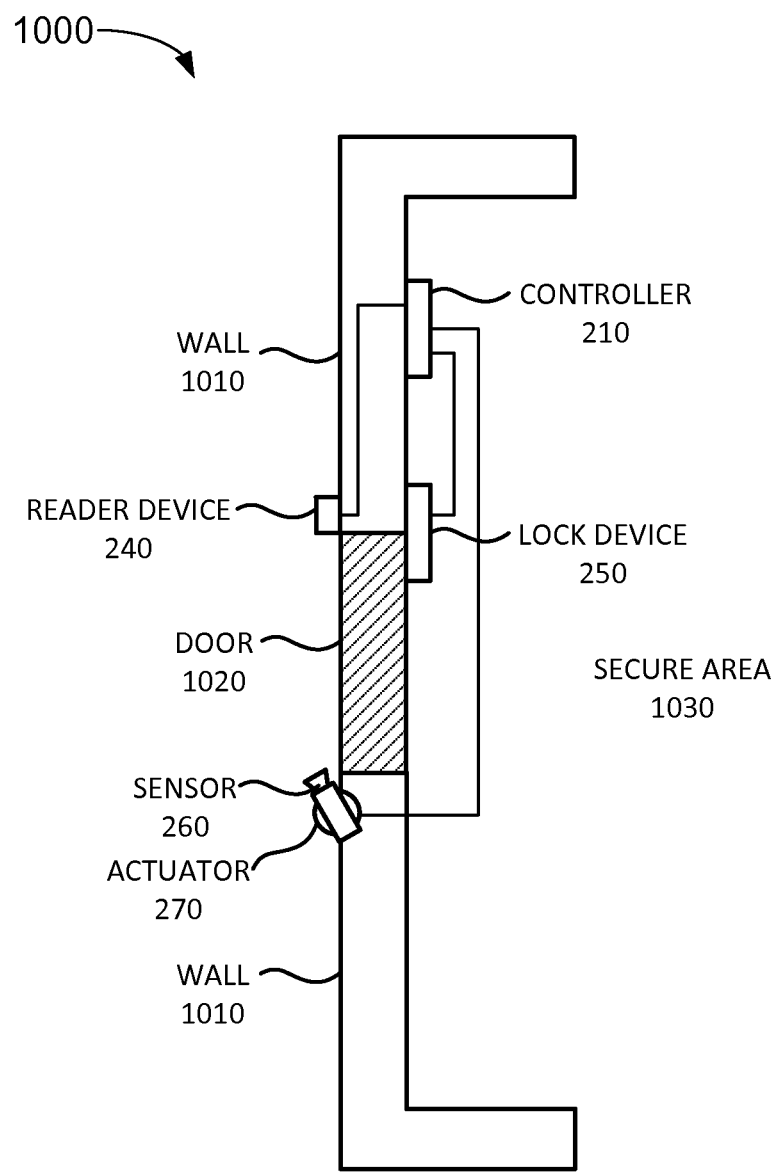
FIG. 10 is a floor plan diagram illustrating an exemplary physical layout of the system unit of FIG. 1.

FIG. 10 is a floor plan diagram illustrating an exemplary physical layout 1000 of system unit 115. As shown in FIG. 10, physical layout 1000 may include a wall 1010, a door 1020, controller 210, reader device 240, lock device 250, sensor 260, and actuator 270.

Wall 1010 encloses a secure area 1030, such as a room in a building. Door 1020 provides access for a user to secure area 1030. In this embodiment, controller 210 is installed inside secure area 1030. In other embodiments, controller 210 may be installed in an insecure area. Reader device 240 is installed outside secure area 1030 and lock device 250 is installed inside secure area 1030 to wall 1010 and door 1020. Sensor 260, in this example, is a monitoring device mounted outside secure area 1030. Actuator 270 includes a motor used to control the field of view of the monitoring device in this example.

When a user enters credentials into reader device 240 (e.g., by entering a PIN, scanning an access card, scanning an iris, etc.), controller 210 may use the credentials to authenticate the identity of the user and may perform a lookup in local credentials table 358 and subsequently in local access rules database 356 to determine whether to grant access to the user based on the identity of the user and the access rules. If controller 210 determines that access should be granted, controller 210 activates lock device 250 to unlock door 1020, thus granting access to the user to secure area 1030.

Although FIG. 10 shows exemplary components of physical layout 1000, in other implementations, physical layout 1000 may include fewer components, different components, additional components, or differently arranged components than depicted in FIG. 10. Additionally or alternatively, any one component (or group of components) in physical layout 1000 may perform a task or tasks described as performed by one or more other components of physical layout 1000.

Figure 11:
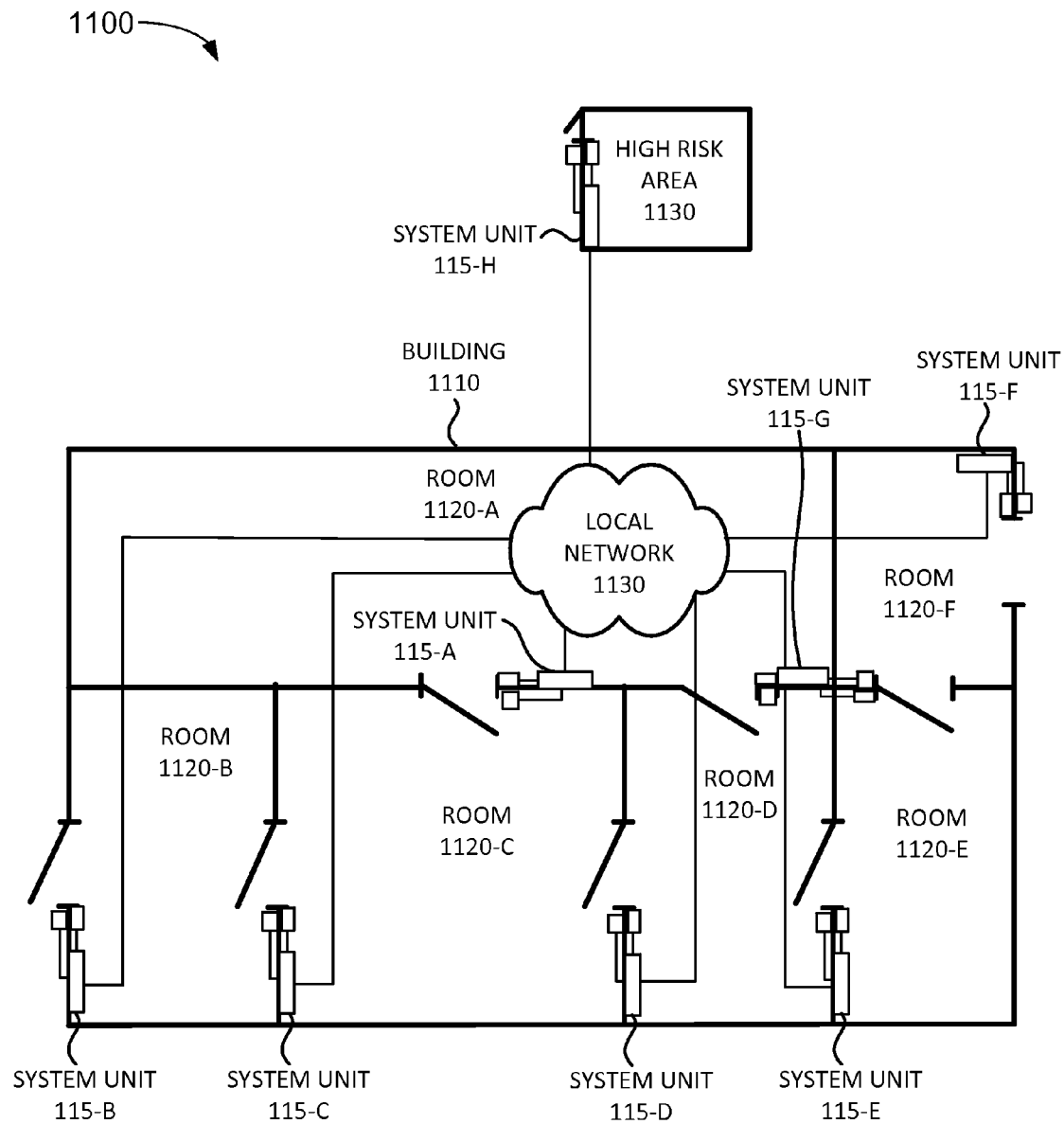
FIG. 11 is a floor plan diagram illustrating an exemplary physical layout of the system of FIG. 1.

FIG. 11 is a floor plan diagram illustrating an exemplary physical layout 1100 of DCS 110. As shown in FIG. 11, physical layout 1100 may include a building 1110 with rooms 1120-A through 1120-F, and a high risk area 1130. A local network 1130, such as an Ethernet network, may interconnect system units 115-A through 115-H. In this example, system unit 115-A controls a door into room 1120-A; system unit 115-B controls an outside door into room 1120-B; system unit 115-C controls one door from room 1120-B to room 1120-C, system unit 115-D controls one door from room 1120-C to room 1120-D; system unit 115-E controls one door from room 1120-D to room 1120-E; system unit 115-F controls an outside door into room 1120-F, system unit 115-G controls one door into room 1120-E and one door into room 1120-A; and system unit 115-H controls a door into high risk area 1130. High risk area 1130 may be located outside of building 1110 and thus may be considered to be at a higher security risk.

In this example, system units 115-A to 115-H do not include a central controlling device (e.g., a server) and may include one or more distributed datasets. For example, system units 115-A through 115-H may maintain a distributed global database, and/or a distributed events log. Assume an administrator uses administration device 130 to log into system unit 115-A to add a user and to add credentials associated with a user. Those added credentials may be distributed to the other system units 115 that control doors to rooms to which the user has access via the process described in FIGS. 5-8.

Although FIG. 11 shows exemplary components of physical layout 1100, in other implementations, physical layout 1100 may include fewer components, different components, additional components, or differently arranged components than depicted in FIG. 11. For example, in another embodiment, a central controlling device (e.g., a server) may be used in conjunction with one or more distributed datasets. Additionally or alternatively, one or more components of physical layout 1100 may perform one or more tasks described as performed by one or more other components of physical layout 1100.

Figure 12A:
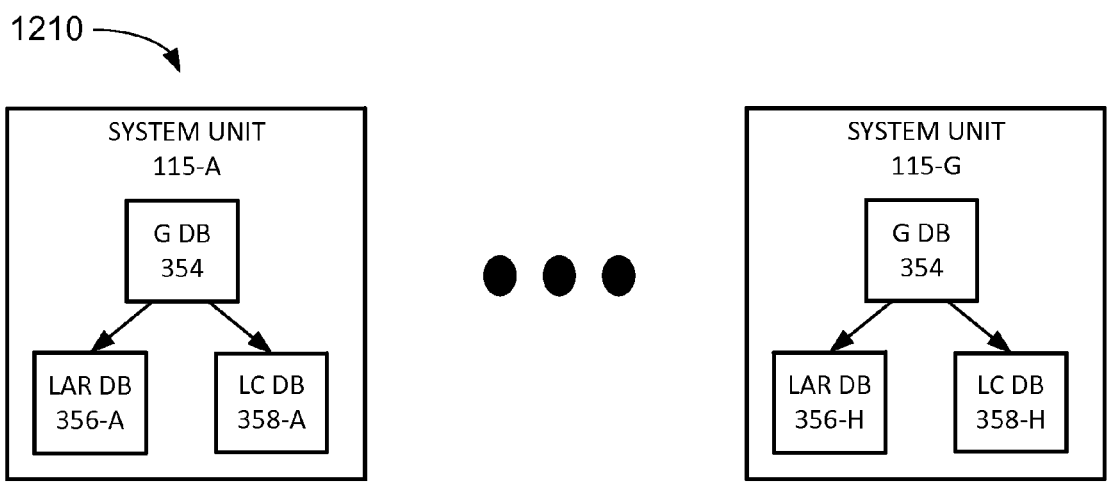
FIG. 12A-12D are exemplary implementations of the global database according to one or more embodiments.

FIG. 12A-12D are exemplary implementations of the global database for the system described in FIG. 11. FIG. 12A illustrates a global database implementation 1210 in which the global database corresponds to a distributed dataset. In global database implementation 1210, each system unit 115 includes local copy of global database 354 and derive local access rule database 356 and local credentials database 358 from global database 354.

Figure 12B:
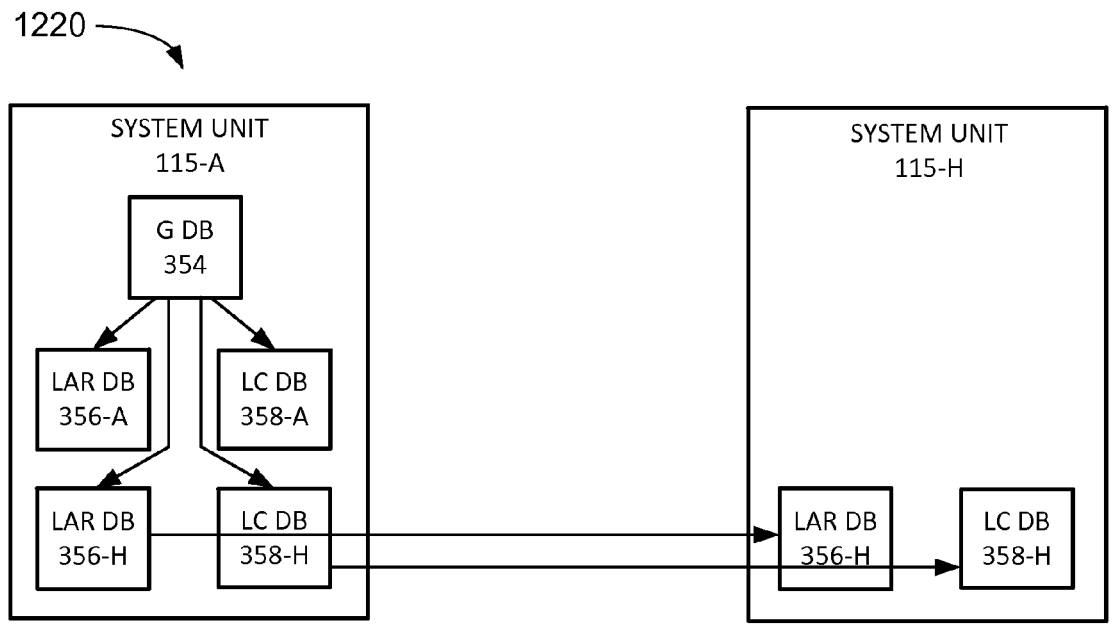

FIG. 12B illustrates a global database implementation 1220 in which a particular system unit 115 derives local access rules database 356 and local credentials table 358 for another system unit 115. For example, since system unit 115-H is located in high risk area 1130, system unit 115-H may be configured without global database 354. Instead, system unit 115-A (or another of system units 115-A to 115-G) may derive local access rule database 356-H and local credentials database 358-H for system unit 115-H and may provide local access rule database 356-H and local credentials database 358-H to system unit 115-H.

Figure 12C:
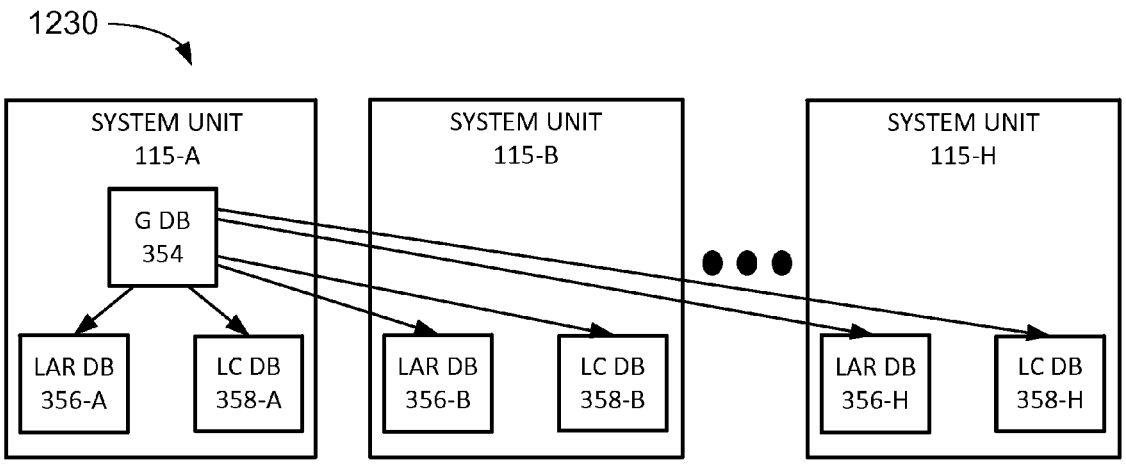

FIG. 12C illustrates a global database implementation 1230 in which one system unit 115 stores global database 354 and enables other system units 115 to access global database 354. For example, system unit 115-A may store global database 354 and may derive local access rule database 356-A and local credentials database 358-A from global database 354. System unit 115-B may derive local access rule database 356-B and local credentials database 358-B from global database 354 by accessing global database 354 at system unit 115-A. Similarly, system units 115-C through 115-H derive local access rule databases 356-B to 356-H, and local credentials databases 358-B to 358-H, respectively, from global database 354 by accessing global database 354 at system unit 115-A. Alternatively, as in FIG. 12B, system unit 115-A may derive local access rule database 356-H and local credentials database 358-H for system unit 115-H and may provide local access rule database 356-H and local credentials database 358-H to system unit 115-H.

Figure 12D:
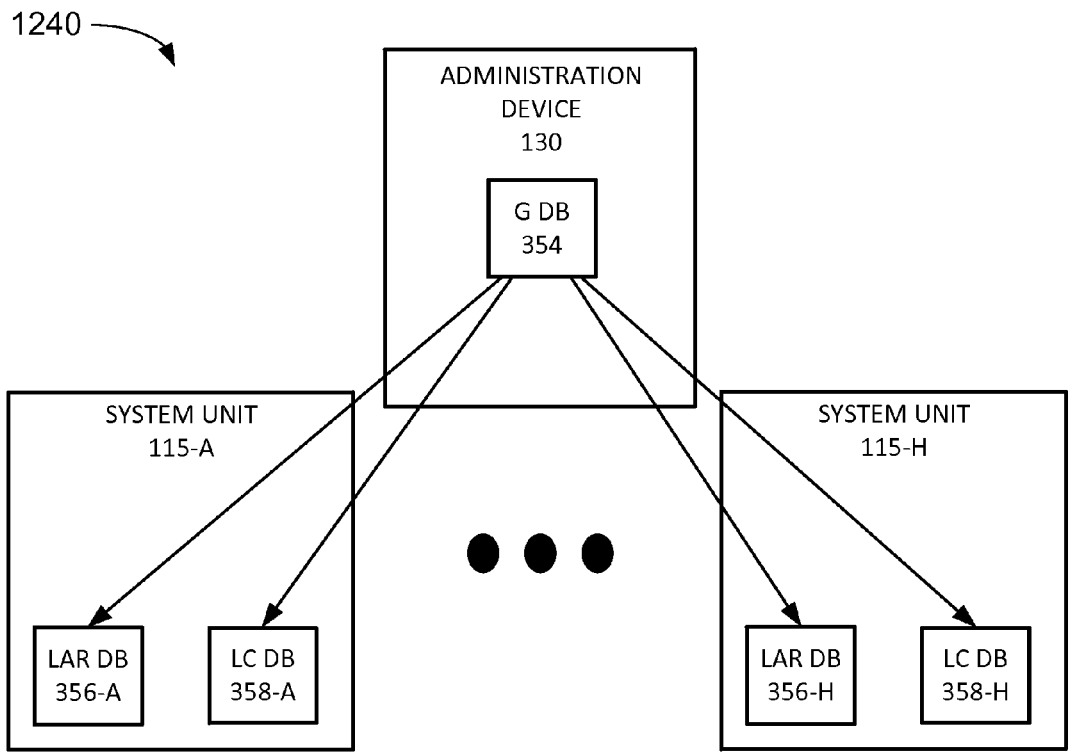

FIG. 12D illustrates a global database implementation 1240 in which administration device 130 stores global database 354 and enables system units 115 to access global database 354. Thus, system units 115-A through 115-H derive local access rule databases 356-A to 356-H, and local credentials databases 358-A to 358-H, respectively, from global database 354 by accessing global database 354 at administration device 130.

FIGS. 13A-13C are diagrams of an exemplary database use scenario according to one or more embodiments. FIG. 13A illustrates part of global database 354 for the system shown in FIG. 11. Though not shown in FIG. 13A, global database 354 may also include groups table 420 and/or access rules table 430. As shown in FIG. 13A, global database 354 may store, in each row, a particular credential type and a corresponding credential value for a particular user. While multiple rows are shown for the user associated with row ID=21 in FIG. 13A for illustrative purposes, in practice the different credential types for user row ID=21 may be stored in a same row in global database 354. While in FIGS. 13A-13C the row ID in global database 354 is used as the anonymous user identifier, in other implementations, a different type of anonymous user identifier may be used.

FIG. 13B illustrates local access rules database 356-G for system unit 115-G. As shown in FIG. 11, system unit 115-G may control two doors: a door into room 1120-E and a door into room 1120-A. Thus, when local access rules database 356-G is derived from global database 354, access rules associated with rooms 1120-A and 1120-E may be included. Four entries in local access rules database 356-G are shown in FIG. 13B. The first entry specifies that all users may access room 1120-E between the hours of 8 AM to 5 PM with an access card. The second entry specifies that users associated with rows 21, 55, and 76 in the global database may access room 1120-E during non-business hours with a combination of an access card and a PIN. The third entry specifies that users associated with rows 44, 55, 66, and 78 in the global database may access room 1120-A at all times with an iris scan. The fourth entry specifies that users associated with rows 33, 44, and 66 in the global database may access room 1120-A in the hours from 5 PM to 8 AM with a combination of an access card and an iris scan.

FIG. 13C illustrates local credentials database 358-G for system unit 115-G. Four entries in local credentials database 358-G are shown in FIG. 13C. The first entry includes a hashed card credentials value for the user associated with row ID=21 in the global database, and the local access rules key encrypted with the unhashed credentials value (the value 40APCE). The second entry includes a hashed value that is a combination of a card credentials value and a PIN, for the user associated with row ID=21 in the global database, and the local access rules key encrypted with a key that is a combination of the card credentials value 40APCE and the PIN value of 1234. The third entry includes a hashed version of an iris scan value for the user associated with row ID=44 in the global database, and the local access rules key encrypted with the unhashed iris scan credentials value. The fourth entry includes a hashed value that is a combination of a card credentials value and an iris scan value, for the user associated with row ID=44 in the global database, and the local access rules key encrypted with a key that is a combination of the card credentials value and the iris scan value for user row ID=44.

Assume user row ID=21 wants to access room 1120-E during non-business hours. The user may place his card against reader device 240 next to the door of room 1120-E and reader device 240 may retrieve the card credentials value of 40APCE from the card. Reader device 240 may provide the credentials value of 40APCE to controller 210 of system unit 356-G. Controller 210 may determine that reader device 240 is associated with room 1120-E. Controller 210 may hash the credentials value and identify an entry in local credentials database 358-G that matches the hashed value. Controller 210 may identify user row ID=21 and may use the obtained credentials value of 40APCE to decrypt the local access rules key. Controller 210 may then use the decrypted local access rules key to decrypt local access rules database 356-G.

Once local access rules database 356-G is decrypted, controller 210 may identify entries for room 1120-E which include user 21. Since controller 210 is able to identify multiple entries (the first entry and the second entry), controller 210 may select the second entry based on the current time. Controller 210 may determine that the user needs to provide both a card credentials value and a PIN. Since the user did not provide a PIN, access may not be granted to the user. In some implementations, the user may be informed as to why access was not granted by, for example, informing the user that a PIN needs to be entered. If the user re-scans the card and enters a PIN within a particular time period, the process may be repeated and the door to room 1120-E may be unlocked by controller 210.

This application incorporates by reference the following applications filed the same day as the present patent application: U.S. patent application Ser. No. 14/028,218 filed Sep. 16, 2013, now U.S. Pat. No. 9,430,509 issued Aug. 30, 2016, titled "Event Timeline Generation"; U.S. patent application Ser. No. 14/028,118 filed Sep. 16, 2013, now U.S. Pat. No. 9,524,174 issued Dec. 20, 2016, titled "Control System Configuration Within an Operational Environment"; U.S. patent application Ser. No. 14/028,243 filed Sep. 16, 2013, now U.S. Pat. No. 9,686,161 issued Jun. 20, 2017, titled "Consensus Loss in Distributed Control Systems"; U.S. patent application Ser. No. 14/028,059 filed Sep. 16, 2013, now U.S. Pat. No. 9,621,644 issued Apr. 11, 2017, titled "Joining a Distributed Database"; U.S. patent application Ser. No. 14/028,198 filed Sep. 16, 2013, now U.S. Pat. No. 9,807,161 issued Oct. 31, 2017, titled "Distributed Events in an Access Control System"; U.S. patent application Ser. No. 14/028,230 filed Sep. 16, 2013, now U.S. Pat. No. 9,619,668 issued Apr. 11, 2017, titled "Managing Application Data in Distributed Control Systems"; and U.S. patent application Ser. No. 14/028,208 filed Sep. 16, 2013 now U.S. Pat. No. 9,641,335 issued May 2, 2017, titled "Distribution of User Credentials".

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5-9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises" and "comprising" specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, the article "a" is intended to include one or more items. Further, the phrase "based on" is intended to mean "based, at least in part, on" unless explicitly stated otherwise.

What is claimed is:

1. A method, performed by a controller device, the method comprising:
   accessing, by the controller device, a global database that includes access control information for a plurality of controller devices,
      wherein the controller device belongs to a distributed system that includes the plurality of controller devices, and
      wherein the global database corresponds to a consensus-based distributed dataset in the distributed system and identifies users and access rules for granting access to a plurality of entities;
   deriving, by the controller device, a local access rules table from the global database,
      wherein the controller device uses the local access rules table to determine whether or not to grant access to an entity associated with the controller device,
      wherein the controller device stores the local access rules table, wherein the local access rules table lists a plurality of users and associates a rule for each corresponding user to access the entity associated with the controller device, and wherein the local access rules table is encrypted with a local access rules key;

deriving, by the controller device, a local credentials table from the global database, wherein the local credentials table relates each of the plurality of users to a corresponding hashed credential, and wherein the local credentials table stores, for each of the plurality of users, the local access rules key encrypted with the corresponding unhashed credential associated with the corresponding user;

receiving, by the controller device, a credential value from a reader device;

identifying, by the controller device, one of the plurality of users from among the plurality of users listed in the derived local credentials table based on the received credential value, when a hashed credential associated with the one of the plurality of users exists in the derived local credentials table, wherein the corresponding unhashed credential is not stored in the controller device as being associated with the corresponding one of the plurality of users before identifying the one of the plurality of users; and executing, by the controller device, one or more access rules associated with the identified one of the plurality of users based on the derived local access rules table, when an access rules entry exists for the user in the derived local access rules table.

2. The method of claim 1, further comprising:
hashing the received credential value;
determining whether a credential entry exists for the hashed credential value in the local credentials table; and
identifying the one of the plurality of users associated with the received credential value in the local credentials table, when the credential entry exists for the hashed credential value in the local credentials table.

3. The method of claim 2, further comprising:
decrypting the local access rules key, associated with the credential entry, using the received credential value;
decrypting the local access rules table using the decrypted local access rules key; and
determining whether the access rules entry exists in the decrypted local access rules table for the one of the plurality of users.

4. The method of claim 1, further comprising:
receiving an update to the global database from an administrator device;
distributing the update to other ones of the plurality of controller devices; and
updating the global database using the received update, wherein the global database is updated at the other ones of the plurality of controller devices.

5. The method of claim 1, further comprising:
storing the global database by the controller device; and
enabling the plurality of controller devices to access the global database.

6. The method of claim 1, wherein the controller device is not a member of the consensus-based distributed dataset of the global database and the global database is stored in another controller device of the plurality of controller devices, and wherein obtaining access to the global database includes:

accessing the global database at the other controller device.

7. The method of claim 1, further comprising:
obtaining an update for the global database;
determining that the update is relevant to at least one of the local access rules table or the local credentials table; and
updating the at least one of the local access rules table or the local credentials table using the updated global database, based on determining that the update is relevant to the local access rules table or the local credentials table.

8. The method of claim 7, wherein the local credentials table is encrypted using a local credentials key, the method further comprising:
decrypting the local credentials table using the local credentials key;
updating a hashed credential value in the local credentials table;
obtaining an unencrypted local access rules key from the global database; and
encrypting the local access rules key with an unhashed credential value, wherein the encrypted local access rules key is associated with the hashed credential value.

9. The method of claim 7, further comprising:
obtaining an unencrypted local access rules key from the global database;
decrypting the local access rules table using the obtained unencrypted local access rules key;
updating the local access rules table; and
encrypting the updated local access rules table.

10. The method of claim 1, wherein the local access rules table associates a particular access location with a particular group of users and with a particular set of access rules.

11. The method of claim 1, further comprising:
deriving a remote local access rules table from the global database for another controller device of the plurality of controller devices;
deriving a remote local credentials table from the global database for the other controller device; and
enabling the other controller device to access the remote local access rules table and the remote local credentials table.

12. The method of claim 1, wherein a user is associated with a global database row number in the global database, wherein the user is associated with the global database row number in the local access rules table, and wherein the user is associated with the global database row number in the local credentials table.

13. The method of claim 6, wherein the controller device is located in an area designated as a high risk area and where the other controller device is located outside the area designated as a high risk area.

14. The method of claim 1, wherein the plurality of controller devices corresponds to a distributed physical access control system, and wherein the controller device corresponds to a physical access control unit.

15. A controller device comprising:
a memory storing instructions; and
a processor configured to execute the instructions to:
access a global database that includes access control information for a plurality of controller devices, wherein the global database identifies users and access rules for granting access to a plurality of entities, and wherein the controller device belongs to a distributed system that includes the plurality of controller devices, and wherein the global database corresponds to a consensus-based distributed dataset in the distributed system;

derive a local access rules table from the global database, wherein the controller device uses the local access rules table to determine whether or not to grant access to an entity associated with the controller device, wherein the controller device stores the local access rules table, wherein the local access rules table lists a plurality of users and associates a rule for each corresponding user to access the entity associated with the controller device, and wherein the local access rules table is encrypted with a local access rules key;

derive a local credentials table from the global database, wherein the local credentials table relates each of the plurality of users to a corresponding hashed credential, wherein the local credentials table stores, for each of the plurality of users, the local access rules key encrypted with the corresponding unhashed credential associated with the user receive a credential value from a reader device;

identify one of the plurality of users from among the plurality of users listed in the derived local credentials table based on the received credential value, when a hashed credential associated with the one of the plurality of users exists in the derived local credentials table, wherein the corresponding unhashed credential is not stored in the controller device as being associated with the corresponding one of the plurality of users before identifying the one of the plurality of users; and execute one or more access rules associated with the identified one of the plurality of users based on the derived local access rules table, when an access rules entry exists for the user in the derived local access rules table.

16. The controller device of claim 15, wherein the processor is further configured to execute the instructions to:
hash the received credential value;
determine whether a credential entry exists for the hashed credential value in the local credentials table; and
identify the one of the plurality of users associated with the received credential value in the local credentials table, when the credential entry exists for the hashed credential value in the local credentials table.

17. The controller device of claim 15, wherein the credential value includes one or more of:
a sequence of keypad characters;
a value obtained from a keycard;
a feature vector obtained from an iris scan;
a feature vector obtained from a voice sample; or
a feature vector obtained from a fingerprint scan.

18. The controller device of claim 16, wherein the processor is further configured to execute the instructions to:
decrypt the local access rules key, associated with the credentials entry, using the received credentials value;
decrypt the local access rules table using the decrypted local access rules key; and
determine whether the access rules entry exists in the decrypted local access rules table for the one of the plurality of users.

19. The controller device of claim 15, wherein the processor is further configured to execute the instructions to:
receive an update to the global database from an administrator device;
distribute the update to other ones of the plurality of controller devices; and
update the global database using the received update, wherein the global database is updated at the other ones of the plurality of controller devices.

20. The controller device of claim 15, wherein the processor is further configured to execute the instructions to:
store the global database by the controller device; and
enable a plurality of other controller devices to access the global database.

21. The controller device of claim 15, wherein the controller device is not a member of the consensus-based distributed dataset of the global database and the global database is stored in another controller device of the plurality of controller devices, and wherein the processor is further configured to execute the instructions to:
access the global database at the other controller device.

22. The controller device of claim 15, wherein the processor is further configured to execute the instructions to:
derive a remote local access rules table from the global database for another controller device;
derive a remote local credentials table from the global database for the other controller device; and
provide the remote local access rules table and the remote local credentials table to the other controller device.

23. The controller device of claim 15, wherein the plurality of controller devices corresponds to a distributed physical access control system, wherein the controller device corresponds to a physical access control unit, and wherein the reader device is connected to the controller device via a peripheral interface.

24. A distributed system comprising:
a plurality of physical access control devices, wherein a particular one of the plurality of physical access control devices is configured to:
access a global database that includes access control information for a plurality of controller devices, wherein the global database identifies users and access rules for granting access to a plurality of entities, and wherein the plurality of physical access control devices belong to a distributed system, and wherein the global database corresponds to a consensus-based distributed dataset in the distributed system;
derive a local access rules table from the global database,
wherein the controller device uses the local access rules table to determine whether or not to grant access to an entity associated with the controller device,
wherein the controller device stores the local access rules table,
wherein the local access rules table lists a plurality of users and associates a rule for each corresponding user to access the entity associated with the controller device, and
wherein the local access rules table is encrypted with a local access rules key;
derive a local credentials table from the global database, wherein the local credentials table relates each of the plurality of users to a corresponding hashed credential, wherein the local credentials table stores, for each of the plurality of users, the local access rules key encrypted with the corresponding unhashed credential associated with the user receive a credential value from a reader device;

identify one of the plurality of users from among the plurality of users listed in the derived local credentials table based on the received credential value, when a hashed credential associated with the one of the plurality of users exists in the derived local credentials table, wherein the corresponding unhashed credential is not stored in the controller device as being associated with the corresponding one of the plurality of users before identifying the one of the plurality of users; and execute one or more access rules associated with the identified one of the plurality of users based on the derived local access rules table, when an access rules entry exists for the user in the derived local access rules table.

25. The distributed system of claim 24, wherein the received credential value includes one or more of:

a sequence of keypad characters;

a value obtained from a keycard;

a feature vector obtained from an iris scan;

a feature vector obtained from a voice sample; or a feature vector obtained from a fingerprint scan.

26. The distributed system of claim 24, wherein the particular one of the plurality of physical access control devices is further configured to:

receive an update to the global database from an administrator device;

distribute the update to other ones of the plurality of physical access control devices; and update the global database using the received update, wherein the global database is updated at the other ones of the plurality of physical access control devices.

* * * * *